(12) United States Patent
Vaindiner et al.

(10) Patent No.: US 11,755,347 B2
(45) Date of Patent: *Sep. 12, 2023

(54) METHOD AND SYSTEM FOR ACCESSING TABLE CONTENT IN A DIGITAL IMAGE OF THE TABLE

(71) Applicant: NICE Ltd., Ra'anana (IL)

(72) Inventors: Alexander Vaindiner, Or-Akiva (IL); Vitaly Shelest, Holon (IL); Semyon Kleinerman, Netania (IL)

(73) Assignee: Nice Ltd., Ra'anana (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/695,188

(22) Filed: Mar. 15, 2022

(65) Prior Publication Data

US 2022/0391228 A1  Dec. 8, 2022

Related U.S. Application Data

(63) Continuation of application No. 16/899,930, filed on Jun. 12, 2020, now Pat. No. 11,307,875, which is a continuation of application No. 16/449,950, filed on Jun. 24, 2019, now Pat. No. 10,740,123, which is a continuation-in-part of application No. 15/921,705,
(Continued)

(51) Int. Cl.
| | | |
|---|---|---|
| *G06T 5/00* | (2006.01) | |
| *G06F 9/451* | (2018.01) | |
| *G06F 8/10* | (2018.01) | |
| *G06T 5/20* | (2006.01) | |

(Continued)

(52) U.S. Cl.
CPC ............... *G06F 9/451* (2018.02); *G06F 8/10* (2013.01); *G06F 8/38* (2013.01); *G06T 5/003* (2013.01); *G06T 5/20* (2013.01); *G06T 7/13* (2017.01)

(58) Field of Classification Search
CPC ... G06F 9/451; G06F 8/10; G06F 8/38; G06F 40/166; G06F 40/18; G06F 40/106; G06F 40/177; G06F 16/258; G06F 16/9024; G06F 16/986; G06F 40/131; G06T 5/003; G06T 5/20; G06T 7/13; G06V 30/416; G06V 30/412; G06V 30/414; G06K 9/00449; H04N 1/3873; H04N 1/00411
See application file for complete search history.

(56) References Cited

U.S. PATENT DOCUMENTS

| | | |
|---|---|---|
| 5,481,741 A | 1/1996 | McKaskle et al. |
| 5,881,381 A | 3/1999 | Yamashita et al. |
| (Continued) | | |

OTHER PUBLICATIONS

Non-Final Office Action of U.S. Appl. No. 15/416,484 dated May 15, 2018.
(Continued)

*Primary Examiner* — Jose L Couso
(74) *Attorney, Agent, or Firm* — PEARL COHEN ZEDEK LATZER BARATZ LLP

(57) ABSTRACT

A system and method for accessing elements of a table in a digital image of the table, including: obtaining the digital image of the table; finding table elements in the digital image based on digital table properties, wherein the table elements define table cells; calculating coordinates of the table cells in the digital image based on the table elements; and accessing content of a selected table cell in the digital image using the coordinates of the selected table element.

20 Claims, 23 Drawing Sheets

Related U.S. Application Data filed on Mar. 15, 2018, now Pat. No. 10,540,167, which is a continuation-in-part of application No. 15/416,484, filed on Jan. 26, 2017, now Pat. No. 10,133,953.

(51) Int. Cl.
    *G06T 7/13*     (2017.01)
    *G06F 8/38*     (2018.01)

(56) References Cited

U.S. PATENT DOCUMENTS

| | | |
|---|---|---|
| 6,226,402 B1 | 5/2001 | Katsuyama |
| 6,327,387 B1 | 12/2001 | Naoi et al. |
| 6,731,314 B1 | 5/2004 | Cheng et al. |
| 6,789,054 B1 | 9/2004 | Makhlouf |
| 7,024,456 B1 | 4/2006 | Simonoff |
| 7,043,529 B1 | 5/2006 | Simonoff |
| 7,366,978 B1 | 4/2008 | Jones et al. |
| 8,117,554 B1 | 2/2012 | Grechishkin et al. |
| 8,387,048 B1 | 2/2013 | Grechishkin et al. |
| 8,433,714 B2 | 4/2013 | Mohan et al. |
| 8,924,884 B2 | 12/2014 | Bank et al. |
| 9,304,837 B2 | 4/2016 | Gallo |
| 10,664,654 B2 | 5/2020 | Marks et al. |
| 10,685,032 B2 | 6/2020 | Hopkins et al. |
| 2002/0002606 A1 | 1/2002 | Jaffe |
| 2004/0123238 A1 | 6/2004 | Hefetz et al. |
| 2004/0243931 A1 | 12/2004 | Stevens et al. |
| 2005/0091576 A1 | 4/2005 | Relyea et al. |
| 2005/0276519 A1 | 12/2005 | Kitora et al. |
| 2006/0026519 A1 | 2/2006 | Vaindiner et al. |
| 2007/0271283 A1 | 11/2007 | Maryka et al. |
| 2007/0277090 A1 | 11/2007 | Raja et al. |
| 2008/0021842 A1 | 1/2008 | Pintos et al. |
| 2008/0040655 A1 | 2/2008 | Tanaka |
| 2008/0163080 A1 | 7/2008 | Kooy et al. |
| 2008/0209348 A1 | 8/2008 | Grechanik et al. |
| 2009/0119578 A1 | 5/2009 | Relyea et al. |
| 2009/0313601 A1 | 12/2009 | Baird et al. |
| 2010/0246958 A1 | 9/2010 | Ma |
| 2011/0002547 A1 | 1/2011 | Enomoto |
| 2011/0088011 A1 | 4/2011 | Ouali |
| 2014/0082424 A1 | 3/2014 | Sanders |
| 2014/0082464 A1 | 3/2014 | Sitrick et al. |
| 2014/0089826 A1 | 3/2014 | Boyd |
| 2014/0297516 A1 | 10/2014 | Brown et al. |
| 2015/0026557 A1* | 1/2015 | Byron .................. G06F 40/177 715/227 |
| 2015/0142418 A1* | 5/2015 | Byron .................... G06F 40/40 704/9 |
| 2016/0026730 A1 | 1/2016 | Hasan |
| 2016/0062961 A1 | 3/2016 | Zhu et al. |
| 2016/0105328 A1 | 4/2016 | Cooper et al. |
| 2016/0140250 A1* | 5/2016 | Wang ................. G06F 16/9577 715/238 |
| 2017/0116179 A1 | 4/2017 | Gagne-Langevin et al. |
| 2017/0124054 A1* | 5/2017 | Campbell ............... G06T 11/60 |
| 2018/0024901 A1 | 1/2018 | Tankersley et al. |
| 2018/0081515 A1 | 3/2018 | Block et al. |
| 2018/0129545 A1 | 5/2018 | Beckett et al. |
| 2018/0176272 A1 | 6/2018 | Zur et al. |
| 2019/0079662 A1 | 3/2019 | Wan et al. |
| 2020/0097711 A1* | 3/2020 | Venkateswaran .... G06V 30/413 |
| 2020/0257848 A1 | 8/2020 | Gagne-Langevin et al. |
| 2020/0265040 A1* | 8/2020 | Jung .................. G06F 16/9024 |

OTHER PUBLICATIONS

Notice of Allowance for U.S. Appl. No. 15/416,484 dated Sep. 20, 2018.
Office Action of U.S. Appl. No. 15/921,705 dated Sep. 16, 2019.
U.S. Office Action for U.S. Appl. No. 16/449,950 dated Apr. 13, 2020.
U.S. Office Action for U.S. Appl. No. 16/701,299 dated Mar. 9, 2021.
Office Action for U.S. Appl. No. 17/338,889 dated May 19, 2023.

\* cited by examiner

800

| Scene Data | Anchor Properties | Control properties |
|---|---|---|
| Name | Name | Name |
| Window Caption | Tree Path | Control Type |
| Window Class Name | Text | Shape Type |
| Process Name | Child Contours Count | Tree Path |
| Window Styles | Shape Rectangle | Shape Rectangle |
| Window Rectangle | | Parent Path |
| Threshold values | | Anchor Name |
| Minimum shape size | | |
| Window Image | | |
| | | |

| Control Name | Methods | Properties | Events |
|---|---|---|---|
| Frame Window | Get Text with OCR | Caption(OCR) | create, destroy |
| Button | Click | Caption(OCR) | clicked |
| Link | Click | Caption(OCR) | clicked |
| Table | Get Cell Text with OCR<br>Set Cell Text | Cell, Row | Selected<br>Text change |
| List Box, List View | Select item | | Selected |
| Tab | Select Tab | | Selected |
| Text | | Text | Text change |
| General Control | Get Text with OCR,<br>Set Text | | Clicked<br>Text change |
| Check Box | Check/Uncheck | | Checked/Unchecked |
| Radio Button | Check/Uncheck | | Checked/Unchecked |

METHOD AND SYSTEM FOR ACCESSING TABLE CONTENT IN A DIGITAL IMAGE OF THE TABLE

RELATED APPLICATION DATA

The present application is a continuation application of U.S. application Ser. No. 16/899,930 filed on Jun. 12, 2020, entitled METHOD AND SYSTEM FOR ACCESSING TABLE CONTENT IN A DIGITAL IMAGE OF THE TABLE, which in turn is a continuation application of U.S. application Ser. No. 16/449,950 filed on Jun. 24, 2019, entitled METHOD AND SYSTEM FOR ACCESSING TABLE CONTENT IN A DIGITAL IMAGE OF THE TABLE, which in turn is a continuation-in-part application of prior U.S. application Ser. No. 15/921,705, entitled IMAGE BASED METHOD AND SYSTEM FOR BUILDING OBJECT MODEL AND APPLICATION STATES COMPARISON AND GRAPHIC-BASED INTEROPERABILITY WITH AN APPLICATION, filed on Mar. 15, 2018, which in turn is a continuation-in-part of prior U.S. application Ser. No. 15/416,484 entitled SYSTEM AND METHOD FOR ENABLING GRAPHIC-BASED INTEROPERABILITY WITH A RUNTIME APPLICATION, filed on Jan. 26, 2017, all of which are incorporated herein in their entirety.

FIELD OF THE INVENTION

The present invention is in the field of interoperability. In particular, the present invention is directed to systems and methods for accessing table content in a digital image of the table.

BACKGROUND OF THE INVENTION

Interoperability may be the ability of a computer system or application to work with other computer systems or applications, typically without special effort on the part of the users. Although many applications exist which can expose to another application or system an external graphical user interface (GUI) for interoperability via an application programming interface (API) or a software development kit (SDK) which allow interaction with the GUI by low-level programming techniques, there exist applications which cannot be connected or have their internal events easily known by any existing technique.

An example of an application which often cannot be connected by standard API and/or SDK techniques is an application executing or running in a remote environment (e.g., in a server/client architecture). In this case, the user (e.g. using the client system) may be able to see an image of an application on the screen of the client device and perform various input operations using a keyboard and/or mouse or touchscreen, but existing application integration techniques cannot recognize user interface (UI) elements or connect to any API exposed by the application, even when such APIs exist and are available or ready to use. As such, a third party application attempting to work with or access an application may not be able to. Examples of remote environments in which this problem is prevalent include the Microsoft Remote Desktop system, the Citrix XenApp system, the PCAnywhere system, and the Oracle VM system.

Interoperability problems can be attributed to one or more of for example lack of a reliable connector (e.g. API or SDK) for an interaction with such applications; and lack of an object model exposed by GUI elements or objects (for example, buttons, list boxes, links, tables, etc.).

One prior attempt at solving the interoperability issue includes technology focused on Optical Mark Recognition (OMR), which is used with Optical Character Recognition (OCR) engines to format text while generating a specific text document. OMR also provides the ability to recognize a text document with a template designed by developers. However, OMR and similar technologies do not provide an ability to interact with an application image, among other deficiencies.

One aspect of interoperability includes working with tables or information presented in grid form (e.g., data organized in rows and columns). For example, a first application running on a client server may generate and present a table on a GUI and a second application may need to interact with the table. In many instances, however, there may not be any reliable connector (e.g. API or SDK) that would enable the second application to interact with the application that generated the table. The second application may, however, be able to obtain or receive a digital image of the table. There exist known solutions that enable recognizing tables in documents or images. A table may be recognized in the document using an OCR engine, and may be represented as formatted text or as a regular matrix with cells as its elements. However, these solutions are appropriate for static tables. Thus, these solutions may not support fluent or real time interaction with dynamic tables, or with tables that may change over time by the first application. Additionally, these solutions may not enable the second application to change the content of the table.

SUMMARY OF THE INVENTION

A system and method for enabling graphic-based interoperability between computer executed applications. A computer system operating as a client may display a graphical user interface (GUI) including control graphic items such as buttons, text boxes, etc. A process may examine the graphical image of the GUI to determine if there has been a change over time in the GUI as displayed which updates a control graphic item. If there has been a change over time in the GUI which updates a control graphic item, an action may be taken, for example updating properties of an object construct corresponding to the control graphic item, raising an event corresponding to an object construct corresponding to the control graphic item, or communicating an event to a process.

Some embodiments of the invention improve the underlying functionality of the computer systems on which embodiments of the invention are executed by for example allowing different executing programs to communicate, integrate, operate together, or work together, or to more efficiently do so. Embodiments of the invention may improve the technology of computer application interoperability and communications. For example, embodiments may enable the development and use of runtime solutions for integration of an application with third party applications, such as applications running in remote environments having only visual representation of the UI on a client (e.g., a customer) desktop. Application communications independent of platform, operating system or standards, and based only on a visual representation, may be achieved. Some embodiments of the invention enhance functionality of applications instantiated on client devices in a server/client architecture, which may make it possible to avoid unnecessary installation, development, or configuration of software on remote servers and client devices, thus conserving memory and maximizing processing power on such servers and devices. Such enhancements may reduce total cost and development time for applications to be run in such environments.

Remote servers provided to customers by external information technology (IT) companies may include security policies and/or physical limitations (memory usage, speed requirements, etc.) which do not allow for installation of certain applications and/or software components on these servers. Some embodiments of the invention solve this problem by providing the functionality of such applications and/or software components without requiring actual installation on such servers, and/or requiring minimal installation on client systems, which may be more accessible to a third party than the server controlling the client application. Furthermore, many applications contain components that are not accessible via existing integration technologies. Some embodiments of the invention enable access to such components, which may lower time and effort of research and development to develop connectors to support these applications by providing an out-of-the-box solution for it. Embodiments may provide a simple way to adapt or connect two pre-existing software packages. Furthermore, some embodiments of the invention may function as a universal real-time connector which may be used with any application type. Such a universal real-time connector may be independent of the application platform (e.g., the desktop, server, etc.) and even independent of any operation system.

These and other aspects, features and advantages will be understood with reference to the following description of certain embodiments of the invention.

According to embodiments of the invention, there is provided a system and method for accessing elements of a table in a digital image of the table. Embodiments may include: obtaining the digital image of the table; finding table elements in the digital image based on digital table properties, wherein the table elements define table cells; calculating coordinates of the table cells in the digital image based on the table elements; and accessing content of a selected table cell in the digital image using the coordinates of the selected table element.

According to embodiments of the invention, the table elements may include at least one of gridlines and table text blocks.

According to embodiments of the invention, the digital table properties may include at least one of: has row separators, has column separators, has row header, has row header separators, has column header, has column header separators, table direction, single line, selection mode and a fragmentation method.

Embodiments of the invention may include obtaining at least one of the digital table properties in a design phase prior to runtime.

According to embodiments of the invention, finding table elements in the digital image may be performed using a fragmentation method that may be selected from: an orthogonality filter method, a gridlines detection method, a morphology detection method, a table skeleton method, a cartoonizing method and Fast line detector method.

According to embodiments of the invention, the orthogonality filter method may include: converting the digital image to a grayscale image; applying a horizontal discrete differentiation operator to the grayscale image to calculate a horizontal derivative and vertical discrete differentiation operator to calculate a vertical derivative for pixels of the grayscale image, wherein the horizontal derivative and the vertical derivative of a pixel form a two-dimensional (2D) vector of the pixel; calculating magnitudes and angles of the 2D vectors of the pixels of the grayscale image; marking a pixel (i,j) as pertaining to a gridline if the pixel (i,j) and its (i+1,j), (i,j+1), (i+1,j+1) neighbors are orthogonal, wherein i and j are pixel indexes; and extracting coordinates of vertical and horizontal gridlines.

According to embodiments of the invention, the cartoonizing method may include: downsampling to the digital image to obtain a down sampled image; performing edge detection on the down sampled image to obtain a processed image; applying a bilateral filter to the processed image to obtain a filtered image; upsampling the filtered image to obtain a zoomed-out image; smoothing the zoomed-out image by applying a median filter with n×n aperture, wherein n is an odd number, to obtain a of smoothed image; converting the smoothed image to a smoothed grayscale image; converting the smoothed grayscale image to a binary image with adaptive threshold; resizing the binary image to the image size of the digital image to obtain a resized binary image; and applying the orthogonality filter method to the resized binary image.

According to embodiments of the invention, the gridlines detection method may include: building grid masks by: converting digital image of the table to a grayscale image; blurring the grayscale image by applying a gaussian blur function to obtain a blurred image; thresholding the blurred image to obtain a binary image; scanning the binary image to obtain a pixel that is connected to a maximal number of pixels with a given color of the binary image; and filling the connected pixels with a first color and the rest of the pixels with a second color to generate a mask; and extracting coordinates of horizontal and vertical gridlines from the mask.

According to embodiments of the invention, the morphology detection method may include: thresholding the digital image to obtain a binary image; blurring the binary image to obtain a blurred image; performing edge detection on the blurred image to obtain a processed image; obtaining a structuring element; performing morphological image processing on the processed image using the structuring element, to find geometry shapes; identifying contours of the geometry shapes using a contour approximation method, wherein the contours represent text blocks in the table image; and generating vertical and horizontal lines between the table blocks, wherein the vertical and horizontal lines form the gridlines of the digital image.

According to embodiments of the invention, the table skeleton method may include: applying a Laplacian filter to the digital image to obtain a filtered image; normalizing the filtered image to obtain a color image; thresholding the color image to obtain a binary image; blurring the binary image to obtain a blurred image; calculating contours of a first color in the blurred image, wherein the contours represent text blocks in the digital image; and generating vertical and horizontal lines between the table blocks, wherein the vertical and horizontal lines form the gridlines of the digital image.

According to embodiments of the invention, the fragmentation method may be selected based on the digital table properties.

According to embodiments of the invention, accessing a selected table cell in the digital image may include performing at least one of: get rows count, get columns count, get cell text, set cell text, click cell, get row cells, get column, get selected row index, get selected column index, get cell image, paste cell, copy cell, get header cell, header click and generate an event if table has changed.

Embodiments of the invention may include: presenting the digital image on the computer; and executing a second program on the computer, the second program to access the table elements.

Embodiments of the invention may include: presenting the digital image on a client device and wherein the computer is remote from the client device.

According to embodiments of the invention, generating an event may include determining that the state of a table graphic item has changed and notifying a process of the change.

According to embodiments of the invention, an event may include at least one of: cell clicked, cell content changed and selection change.

According to embodiments of the invention, determining that the state of a table graphic item has changed may include: periodically capturing the table image; and comparing the captured table images.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

FIG. 8 is a scene design-time data table, according to at least one embodiment of the invention;

FIG. 10 is a control methods, properties and events table, according to at least one embodiment of the invention;

FIG. 23 depicts a second digital image of a table, and an example of a dialog box in which a user can define the table properties, according to embodiments of the invention.

Figure 1:
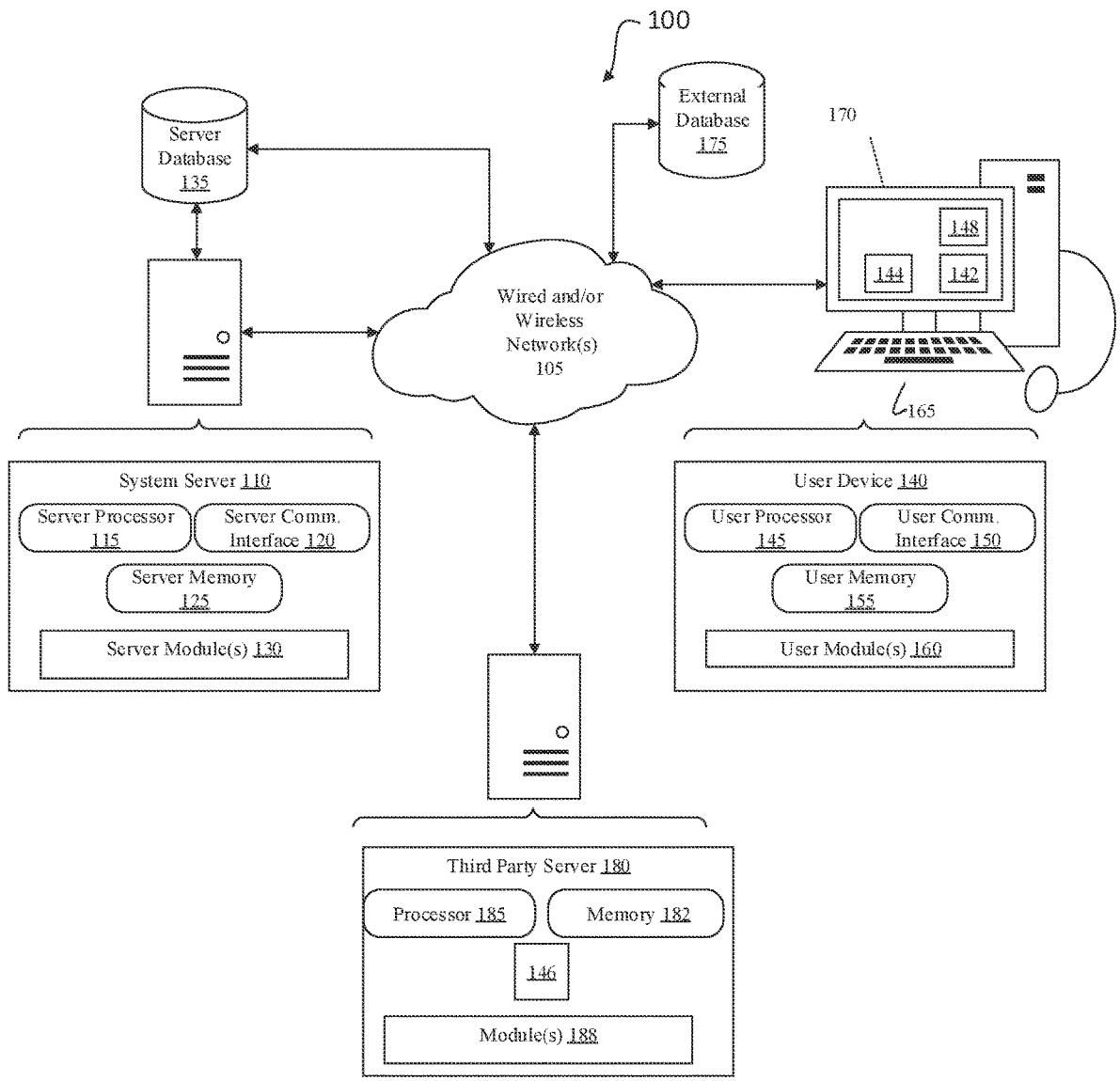
FIG. 1 is a high-level diagram illustrating an example configuration of a system for enabling graphic-based interoperability with a runtime application according to at least one embodiment of the invention.

It will be appreciated that, for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory processor-readable storage medium that may store instructions, which when executed by the processor, cause the processor to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof may occur or be performed simultaneously, at the same point in time, or concurrently.

Some embodiments of the invention enable graphic-based interaction with GUI elements or controls of an application by for example using shape analysis or other graphical analysis of a graphical image of the GUI output for an application (which may be termed "application image", which may vary over time as the application state changes), which can be considered the display a human user views as produced by the application, to identify graphical objects or controls with which interaction can be enabled. Some embodiments of the invention provide a GUI object model and/or algorithms for interaction with GUI elements of an application recognized as components in application image. Some embodiments of the invention recognize well known graphical objects and graphical object types such as, for example, application windows, GUI components, controls etc., on. e.g., a computer screen image. For this purpose, some embodiments of the invention apply a contour and/or shapes analysis of an application image, e.g., from a captured screen image.

Graphical, visual or GUI objects when discussed herein can typically include visual representations of on-screen graphics or controls, and may differ from objects in the programming sense, although programming objects can represent the visual graphics objects. Objects in the programming or software sense may be, in the class-based object-oriented programming model, a particular instance of a class and may be called for example instantiated objects, or runtime objects. Graphical or GUI objects may include for example buttons, icons, menus, cursors, text boxes, controls, frame windows, links, list boxes, tables, combination (combo) boxes, tabs, sliders, etc. Graphical or GUI objects may have corresponding instantiated or software objects. In some embodiments, objects in the programming or software sense and according to the class-based object-oriented programming model may be not actual instantiated object-oriented objects, but rather a construct used internally by an executing application to represent on-screen objects.

Some embodiments of the invention use for example two phases or modes: a design-time phase or mode for defining and collecting graphical shapes information, and a runtime phase or mode for applying the graphical shapes information to an application in real time. When referred to herein, design-time may refer to an analysis, preparatory or setup type mode or stage during which embodiments of the invention may analyze an application image (which may vary over time as the application state changes or updates, and which thus may require that the application is executed over a period of time), e.g., by applying one or more image processing algorithms, to learn about, identify, define, and/or mark-up objects in the application image such that the those objects can be later identified, constructed, and/or made operable during a runtime mode or stage. In some embodiments, during a design-time mode, a scene and/or control anchors (e.g., shape anchors) may be defined, geometric relationships between anchors may be identified, GUI control types may be specified, and controls data, anchors data and/or the application image may be collected and/or stored.

Runtime may refer to mode or stage during which the application is actually running and available for operability. As applied to some embodiments of the invention, during a runtime mode, an appropriate scene (e.g., the application state) may be recognized, for example, based on the collected design-time data, and interaction with GUI elements/ objects of application may be enabled. e.g., as though a user were interacting directly with the application.

In some embodiments, as described in detail herein, during a design-time mode, actions/steps may be implemented such as for example: edges and contours detection; polygonal approximation of each contour; calculation of shape bounding rectangle(s); defining shape properties (e.g., shape anchors and/or shape controls), such as approximate points, children counts, rectangles, child contours, etc.; defining scene anchors for control shapes; defining geometric relationships between anchors to identify controls of the scene at runtime; specifying GUI control types (e.g., shape control types), such as frame windows, buttons, links, list boxes, tables, combo boxes, tabs, sliders, etc.; and calculating an image histogram for each shape (e.g., to compare shape histograms instead of image comparison). Different and/or other actions may be used.

In some embodiments, during a runtime mode, actions/ steps may be implemented such as for example: recognizing (e.g., identifying, finding, etc.) the frame window shape, e.g., by comparison of the image histogram (calculated at design-time) with an image histogram (created at runtime) or an application image captured at runtime; identifying one or more shape anchors by comparison of design-time/runtime histograms and/or the maximum coincidence of child contours; identifying control shapes by comparison of design-time/runtime histograms and geometric relationships between control anchors; intercepting image paint calls (e.g., BitBlt. StrechBlt, etc.) to identify image changes or updates (representing, e.g., various application states) and provide performance optimization for remote control applications; recognizing input device (e.g. mouse/touchscreen and keyboard) hooks (e.g., via the Windows API) indicating user activity events; recognizing graphics device interface (GDI) drawing functions occurring on the client computer or terminal; recognizing Window or other GUI system events hook and subclass window procedures, e.g., redraw messages; recognizing a timer timeout or the end of a time period; and emulating runtime controls and their various actions, properties, and events, etc. Different and/or other actions may be used.

According to embodiments of the invention, a first application may present a digital image of a grid or table, e.g., in a GUI, and a second application may access elements of the table in the digital image of the table. Embodiments of the invention may include obtaining or receiving the digital image of the table; finding table elements in the digital image based on digital table properties, wherein the table elements define (e.g. by presenting an outline or box that indicate the location of the cell) table cells; calculating coordinates of the table cells in the digital image based on the table elements; and accessing content of a selected table cell or box in the digital image using the coordinates (e.g., relative location of a pixel on x and y axes, in relation to a known point. e.g., to the top left corner of the image, of the table etc.) of the selected table element. According to embodiments of the invention, at least some of the digital table properties may be obtained, from a user or determined by a processor, in a design phase prior to runtime.

FIG. 1 shows a high level diagram illustrating an example configuration of a system 100 for enabling interoperability with a runtime application, according to at least one embodiment of the invention. System 100 includes network 105, which may include the Internet, one or more telephony networks, one or more network segments including local area networks (LAN) and wide area networks (WAN), one or more wireless networks, or a combination thereof. System 100 includes a system server 110. In some embodiments, system server 110 may be a stand-alone computer system. In other embodiments, system server 110 may include a network of operatively connected computing devices, which communicate over network 105. System server 110 may include multiple processing machines such as computers, and more specifically, stationary devices, mobile devices, terminals, and/or computer servers (collectively, "computing devices"). Communication with these computing devices may be, for example, direct or indirect through further machines that are accessible to the network 105.

System server 110 may be any suitable computing device and/or data processing apparatus capable of communicating with computing devices, other remote devices or computing networks, receiving, transmitting and storing electronic information and processing requests as further described herein. System server 110 is therefore intended to represent various forms of digital computers, such as laptops, desktops, workstations, personal digital assistants, servers, blade servers, mainframes, and other appropriate computers and/or networked or cloud based computing systems capable of employing the systems and methods described herein.

System server 110 may include a server processor 115 which is operatively connected to various hardware and software of system 100. Server processor 115 serves to execute instructions to perform various operations relating to embodiments of the invention. Server processor 115 may be one or a number of computer processors, a central processing unit (CPU), a graphics processing unit (GPU), a multi-processor core, or any other type of processor.

System server 110 may be configured to communicate via communication interface 120 with various other devices connected to network 105. Server memory 125 may be accessible by server processor 115, thereby enabling server processor 115 to receive and execute instructions such a code, stored in the memory and/or storage in the form of one or more software modules 130, each module representing one or more code sets. Software modules 130 may include one or more software programs or applications (collectively referred to as the "server application") having computer program code or a set of instructions executed partially or entirely in server processor 115 for carrying out operations for aspects of the systems and methods disclosed herein, and may be written in any combination of one or more programming languages. Server processor 115 may be configured to carry out embodiments of the present invention by, for example, executing code or software, and may execute the functionality of the modules as described herein.

Server modules 130 may include more or less actual modules which may be executed to enable functionalities of the invention. Server modules 130 may be executed entirely on system server 110 as a stand-alone software package, partly on system server 110 and partly on user device 140, or entirely on user device 140. Device 140 may be remote from third party server 180.

Server memory 125 may be, for example, a random access memory (RAM) or any other suitable volatile or non-volatile computer readable storage medium. Server memory 125 may also include storage which may take various forms. For example, the storage may contain one or more components or devices such as a hard drive, a flash memory, a rewritable optical disk, a rewritable magnetic tape, or some combination of the above. In addition, the memory and/or storage may be fixed or removable. In addition, memory and/or storage may be local to the system server 110 or located remotely.

System server 110 may be connected to one or more database(s) 135, for example, directly or remotely via network 105. Database 135 may include any of the memory configurations as described herein, and may be in direct or indirect communication with system server 110. In some embodiments, database 135 may store information relating to user documents. In some embodiments, database 135 may store information related to one or more aspects of the invention.

User device 140 may connected to the network 105 and may be any standard computing device, for example a desktop computer, smart terminal, dumb terminal, kiosk and/or other machine, each of which generally has one or more processors, such as user processor 145, configured to execute code, a computer-readable memory, such as user memory 155, a user communication interface 150, for connecting to the network 105, one or more user modules 160, one or more input devices 165, and one or more output devices 170. Typical input devices, such as, for example, input devices 165, may include a keyboard, pointing device (e.g., mouse or digitized stylus), a web-camera, and/or a touch-sensitive display, etc. Typical output devices, such as, for example output device 170 may include one or more of a monitor, display, speaker, printer, etc.

In some embodiments, user module 160 may be executed by user processor 145 to provide the various functionalities of user device 140. In particular, in some embodiments, user module 160 may provide a user interface with which a user of user device 140 may interact, to, among other things, communicate with system server 110. For example, system server 110 may execute a client/server, "target" or "monitored" application 142 as the server of a server/client architecture, and user device 140 may display the GUI display as controlled by server 110 and accept input to send to server 110. For example, system server 110 may generate a table and device 140 may display an image of the table, also referred to herein as a digital image 148 of the table, as part of the GUI display using application 142. In some embodiments application 142 may generate the table and display digital image 148 of the table.

In some embodiments, user device 140 may be or act as a "dummy" terminal, by which processing and computing may be performed on system server 110, and information may then be provided to user device 140 via server communication interface 120 for display and/or basic data manipulation. In some embodiments, modules depicted as existing on and/or executing on one device may additionally or alternatively exist on and/or execute on another device. For example, in some embodiments, one or more modules of server module 130, which is depicted in FIG. 1 as existing and executing on system server 110, may additionally or alternatively exist and/or execute on user device 140. Likewise, in some embodiments, one or more modules of user module 160, which is depicted in FIG. 1 as existing and executing on user device 140, may additionally or alternatively exist and/or execute on system server 110.

A computing device discussed herein may be a mobile electronic device ("MED"), which is generally understood in the art as having hardware components as in the stationary device described above, and being capable of embodying the systems and/or methods described herein, but which may further include componentry such as wireless communications circuitry, etc. Non-limiting examples of typical MEDs are smartphones, personal digital assistants, tablet computers, and the like.

Third party server 180 may operate software or applications which may interact with or receive information from target or monitored application 142 operated via system server 110 and displayed on user device 140 via methods as disclosed herein. Since third party server 180 may not have access to, or API access to, client software operated by system server 110 and displayed in a GUI on device 140, embodiments of the invention may provide an API for third party server 180 to interact with the client software via a specially made GUI which gathers information from graphical changes on user device 140. For example, system server 110 may execute a client/server, "target" or "monitored" application 142 as the server of a server/client architecture, and user device 140 may display the GUI display as controlled by server 110 and accept input to send to server 110.

For example, third party server 180 may operate software or applications such as RT server software modules 188 (e.g. the Real-Time Process Optimization available from NICE, of Raanana, Israel) which are intended to monitor and possibly control an interaction between a customer and a human agent, where the human agent is using application 142: this interaction between RT server software modules 188 and agent application 142 may be performed by embedded or monitoring software typically executed on the same computer that executes agent application 142 such as RT client 144. Software such as RT server software modules 188 may communicate with agent application 142 and may be remote from agent application 142, and this communication may be via RT client 144. Third party server 180 may receive information from application 142 (which may be considered a monitored application) and in some cases may send messages to or control application 142, for example send messages including suggestions to the agent regarding the customer interaction. One or more items of embedded software, monitoring software or RT client 144 may be executed by user device 140 to monitor and/or communicate with application 142 and generate events, alerts, etc., and to operate or act as software objects to allow interaction between third party server 180 and application 142. Third party server 180 may include one or more input devices and output devices such as, for example, keyboards, pointing devices, monitors, displays, speaker, printer, etc. In one embodiment RT server 188 or other software interacts with agent application 142 via embedded software such as RT client 144. In another embodiment agent application 142 is controlled by and sends input to RT client 144 with no other program controlling RT client 144. Generating, triggering or raising an event may include notifying a process (e.g., a process within or part of RT client 144, or a process external to RT client 144, such as RT server software modules 188, of the change.

According to embodiments of the invention. RT server software modules 188, RT client 144 or other third party software, process or application which does not have connector (e.g. API or SDK) for an interaction with application 142, may access the table elements based on digital image 148 of the table, presented by application 142. This may be achieved by processing digital image 148 to extract table boxes, data or elements, for example, using image processing techniques and fragmentation methods presented herein, and reconstructing the table using the extracted table elements. Software such as RT server software modules 188 may gain access to elements of the table in the digital image 148 of the table, and this access may be provided via RT client 144. In other embodiments. RT client 144 may access elements of the table in the digital image 148 of the table with no other software module controlling RT client 144. Access elements of the table in the digital image 148 may include performing an action to change or retrieve a data element in the table, and/or detecting changes in the table image and generating or raising an event in response.

Third party server 180 may communicate over network 105 and may include one or more processing machines such as computers. Third party server 180 may be any suitable computing device and/or data processing apparatus such as servers, laptops, desktops, workstations, personal digital assistants, etc. Third party server 180 may include one or more computer processors 185 which may be configured to carry out methods as disclosed herein (possibly in conjunction with processors 115 and 145) and may be one or a number of computer processors, a central processing unit (CPU), a graphics processing unit (GPU), a multi-processor core, or any other type of processor. Third party server 180 may include memory 182 storing for example data and/or code such as RT server 188. RT server 188 may include one or more software programs or applications having computer program code or a set of instructions executed partially or entirely by processor 185 for carrying out operations as disclosed herein. Modules such as RT server 188 may for example communicate with RT client 144 to receive input from and/or control or send instructions to monitored application 142, or cause application 142 to receive input, such as text inserted into a textbox, or controls selected or clicked, at the initiative and control of modules such as RT server 188. Such communication may be performed by software objects corresponding to controls within application 142. Processor 185 may be configured to carry out embodiments of the present invention by, for example, executing code or software, and may execute the functionality of RT server 188 or other modules.

Third party server memory 182 may be, for example, a random access memory (RAM) or any other suitable volatile or non-volatile computer readable storage medium and may include storage which may take various forms, and may be located remotely.

Figure 2:
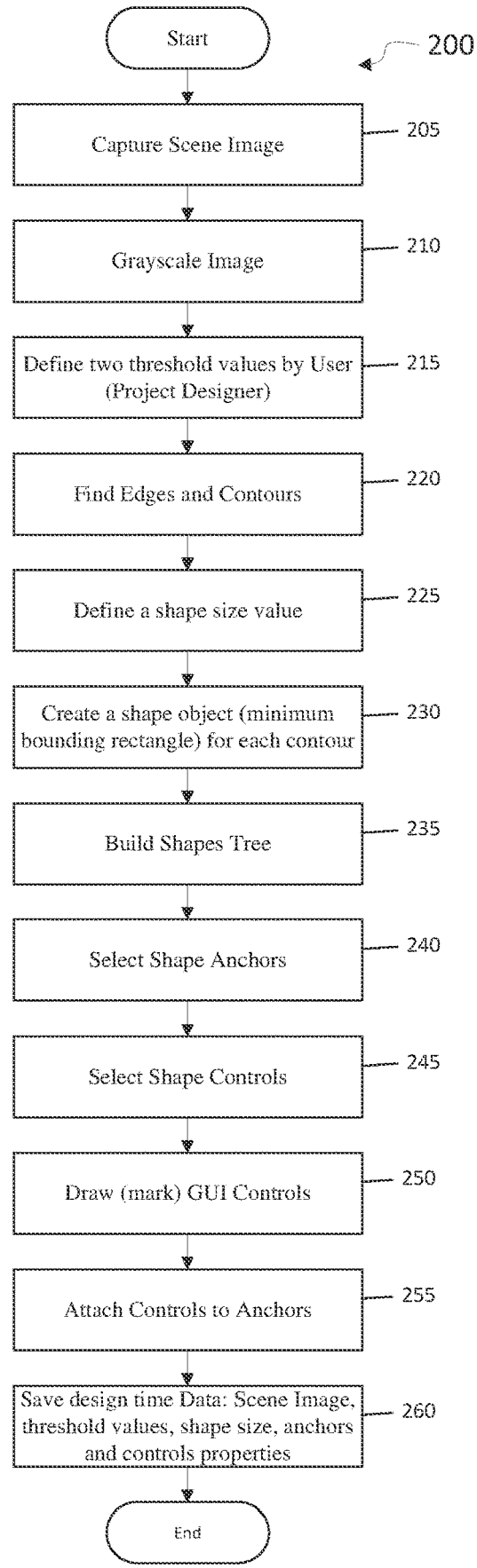
FIG. 2 is a flow diagram of a first part of a method for enabling graphic-based interoperability with a runtime application according to at least one embodiment of the invention.

FIG. 2 is a flow diagram of one embodiment for a "designer" stage, for identifying and/or defining GUI objects in an application image during a design-time learning stage, mode, or process, according to embodiments of the invention. FIG. 2 shows a learning method or process in which characteristic data models or scenes are generated and stored for later recall. Furthermore, in some embodiments, method 200 may be configured to implement one or more of the elements/features/functions of system 100.

Figure 3:
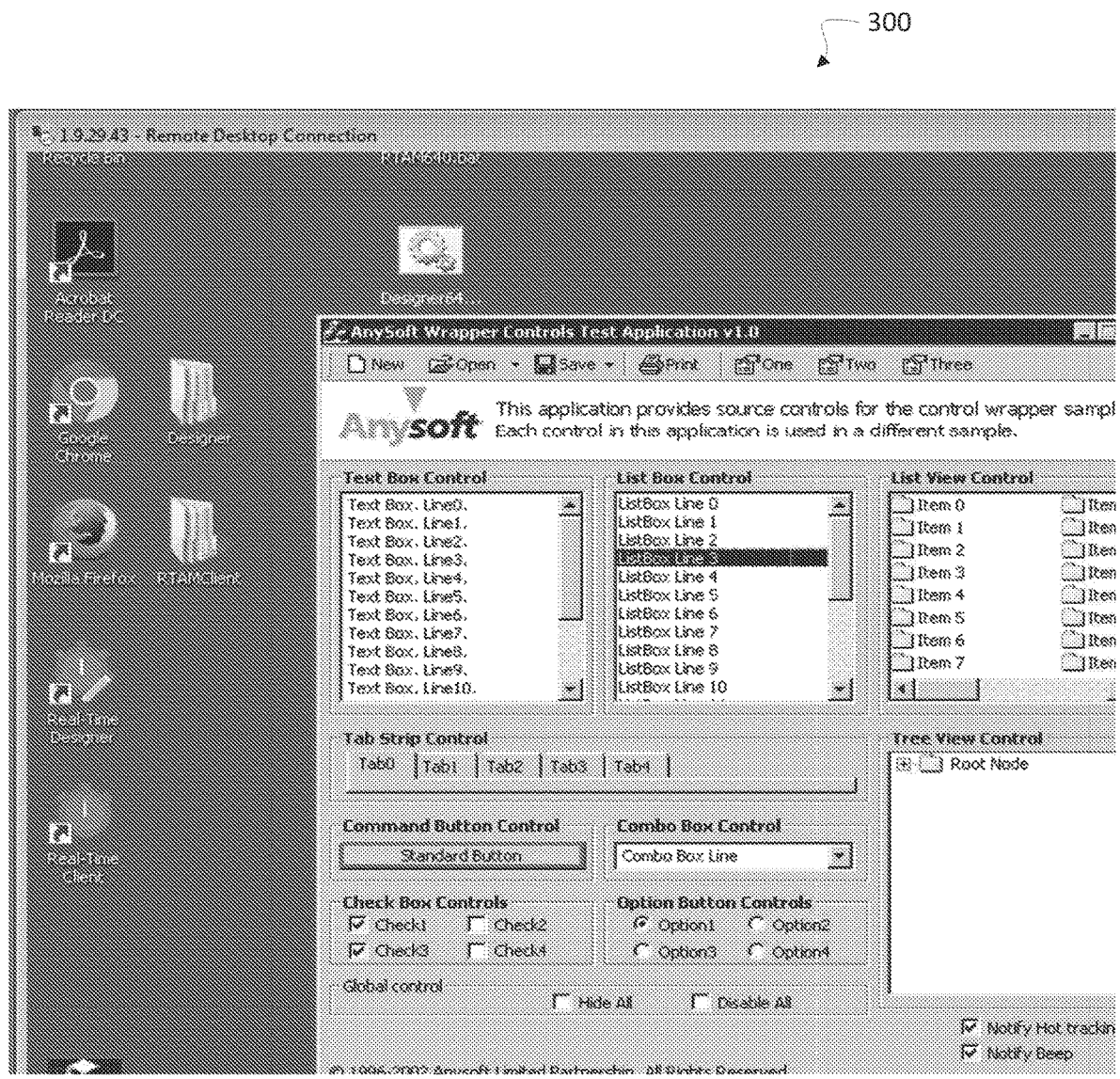
FIG. 3 is an example captured application image, according to at least one embodiment of the invention.

As with other methods described herein, method 200 may be performed on a computer having a processor, a memory, and one or more code sets stored in the memory and executed by the processor, such as but not limited to the devices depicted in FIG. 1. At step 205 a design-time application image is received. Receiving may include, for example, capturing the image of the application as a "screenshot," e.g., by use of a print-screen function or other image and/or screen capture method and/or device, or receiving a previously captured image of the application. In some embodiments, the application image may include, for example, an entire application window, a portion of an application window, an entire display including portions and/or entire windows of one or more applications, a portion of a display, etc. For example, turning briefly to FIG. 3, a captured application image 300 is shown according to at least one embodiment of the invention.

Figure 4:
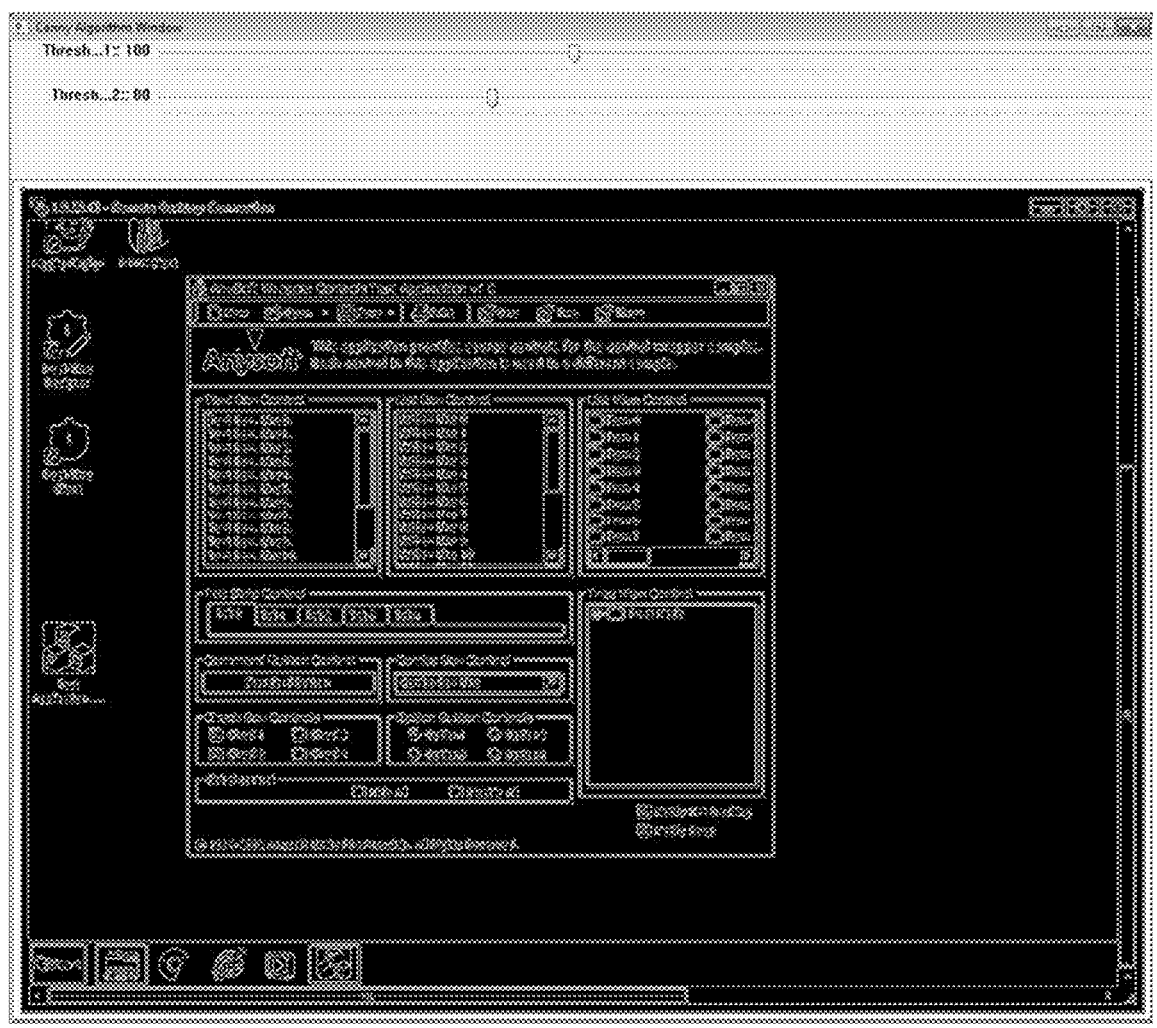
FIG. 4 is an example captured application image shown, with edges and contours, converted to grayscale, according to at least one embodiment of the invention.

At step 210, the captured/received application image may be transformed or converted to a greyscale version of the image. For example, the image may be processed with a grayscaling function (CvCvtColor) from OpenCV library, or the like. For example, turning briefly to FIG. 4, a captured application image 400 is shown, with edges and contours, converted to grayscale. In some embodiments, transforming or converting the application image to grayscale may not be performed, for example, in embodiments where color does not impact detection/identification of edges and/or contours in the application image and/or in embodiments when the application image is already in grayscale.

At step 215, one or more (e.g., two) threshold values may be defined which may impact detection of edges and contours in an image. For example, in some embodiments of the invention, the processor may receive one or more threshold values from a user to be implemented in an edge detection algorithm such as the Canny operator or the Canny Edge Detector function (CvCanny) from OpenCV library, or the like. In some embodiments, the processor may be configured to automatically determine optimal or near optimal threshold values for detection of edges.

The Canny edge detector is an edge detection operator that uses a multi-stage algorithm to detect a wide range of edges in images. Canny edge detection is a technique to extract useful structural information from different visual objects (e.g., objects visually represented in an application image) and dramatically reduce the amount of data to be processed. In some embodiments, the Canny edge detector may apply a Gaussian filter to smooth the image in order to remove noise, find the intensity gradients of the image, apply non-maximum suppression to remove spurious responses to edge detection, track edges by hysteresis, and/or finalize the detection of edges by suppressing edges that are weak and not connected to strong edges, etc.

At step 220, one or more edges and/or one or more contours in the application image may be found and/or identified. For example, in some embodiments, the processor may be configured to identify one or more edges. e.g., by executing an edge detection algorithm such as the Canny Edge Detector function (CvCanny) from OpenCV library, or the like. Furthermore, for example, in some embodiments, the processor may be configured to identify one or more contours, e.g., by executing a contour detection algorithm such as the CvFindContours function from OpenCV library, or the like. Such a contour detection algorithm may find contours using edges returned from an executed edge detection algorithm (e.g., CvCanny function). Of course, those of ordinary skill in the relevant art will understand that there are a number of algorithms which may be implemented, alone or in combination, to filter, identify, and/or detect edges (Edges detectors), for example: Canny edge detector (operator), Sobel operator, Laplace operator, etc.

In some embodiments, for example when the application image is quite complex, visual objects in the application image may be distinguished by identifying contours (and/or edges) of such visual objects within the application image. As understood herein, a contour may be defined as a curve joining a plurality of continuous points (e.g., along the boundary), having the same color or intensity. A contour may be, for example, an external outline (e.g., stroke) of a visual object that separates it from the background and/or other visual objects in the image. Algorithms known to those of ordinary skill in the art and/or as described herein may be executed in various embodiments to implement convenient methods for the detection and manipulation of image contours. For example, a FindContours function of the OpenCV library may be used for retrieving, detecting, and/or identifying contours. In some embodiments, a processor may implement an approximation method which may compress one or more horizontal, vertical, and/or diagonal segments, leaving, e.g., only their end points (for example, using a CV_CHAIN_APPROX_SIMPLE method). Detection of edges and contours in an application image enables defining of bounding shape objects as result of this processing, as described herein.

At step 225, one or more shape size values may be defined. A shape size value may define, for example, a minimum and/or maximum perimeter (e.g., shape size) for which abounding shape object may be generated. A bounding shape object may be defined as a bounding shape (e.g., a rectangle), for example, a minimum bounding shape, surrounding, bounding, enclosing, identifying, and/or otherwise relating to a specific or given contour, set of contours, set of one or more edges and/or one or more contours (e.g., typically an identified visual object or other shape), etc. As such, one or more shape size values may be defined in accordance with embodiments of the invention to define, e.g., minimum and/or maximum acceptable sizes for bounding shape objects to be generated as explained herein. Minimum and/or maximum shape values may, for example, prevent the system from bounding unnecessary and/or irrelevant visual objects (e.g., visual objects which are likely too small or too large to be GUI control elements or objects of interest to the user, but which nonetheless have a definable contour). In some embodiments, one or more shape values may be calculated, estimated, recommended, and/or suggested automatically by the processor. In some embodiments, the processor may receive one or more shape values as input from a user. Furthermore, in some embodiments, e.g., when too many visual objects are identified, the processor may be configured to remove visual objects/shapes with bounding rectangles less than a previously defined shape size, e.g., in real-time, for example, based on feedback from a user.

Figure 5:
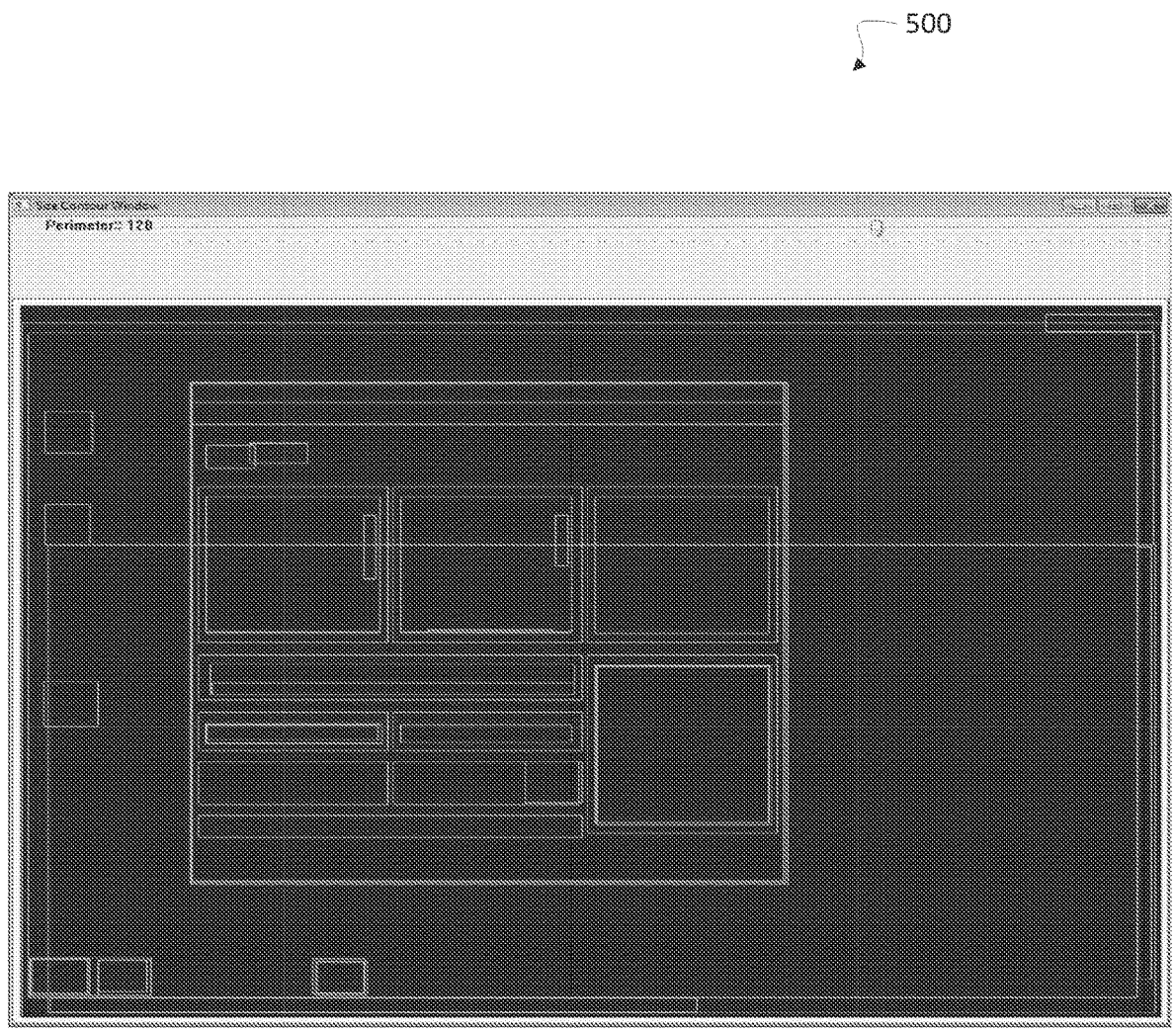
FIG. 5 is an example set of generated bounding shape objects, according to at least one embodiment of the invention.

At step 230 a bounding shape object (e.g., abounding shape such as a minimum bounding rectangle) for one or more contours, one or more edges, and/or one or more visual objects identified in the application image may be created and/or generated. For example, FIG. 5 depicts a set of generated bounding shape objects 500 is shown according to at least one embodiment of the invention. In should be noted that while in the example embodiment of FIG. 5 rectangles were generated to bound the various objects, in other embodiments other regular and/or irregular shapes may also or alternatively be generated in order to define the boundaries of various visual objects, shapes, contours, and edges within an application image as appropriate.

Figure 6:
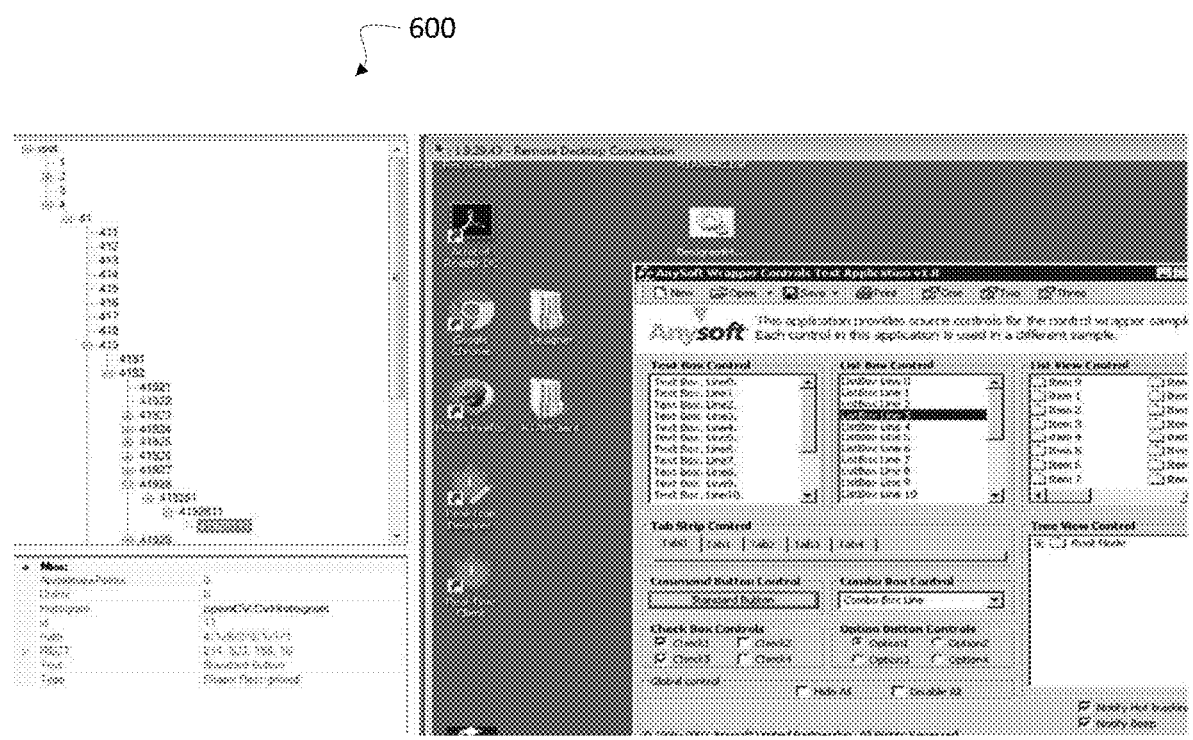
FIG. 6 is an example shapes tree, according to at least one embodiment of the invention.

At step 235 a shapes tree (e.g., a shape object tree) based on the various bounding shape objects generated in step 230 may be built. In some embodiments, for example, all bounding shape objects with a bounding rectangle larger than e.g., a defined minimum rectangle size may be placed in a shapes array. This array may be processed, and a shape objects tree may be built. For example, FIG. 6 depicts an example portion of a shapes tree 600 according to at least one embodiment of the invention.

A hierarchy of the shapes tree may be defined using an algorithm based, e.g., on coordinates nesting. Each tree node (e.g., representing a bounding shape object) may have an associated set of properties, for example: path in tree, coordinates (e.g., relative to the top left corner of the image), histogram data (as described herein), text if any (e.g., recognized using OCR), child (e.g., internal) shapes and contours, etc. In some embodiments, the shapes tree may be built in accordance with nesting coordinates. For example, each shape which encloses one or more other shapes may be considered as a parent and all shapes enclosed within may be considered as children.

In order to include histogram data in the shapes tree, in some embodiments a histogram (e.g., a design-time histogram) may be constructed based on the defined bounding shape properties of the various bounding shape objects. Histograms can be used to represent such diverse information as the color distribution of an object, an edge gradient template of an object, the distribution of probabilities representing an expected object location, etc. Therefore, in some embodiments, one or more points of interest may be identified in an application image by assigning each point of interest a "tag" consisting of histograms of nearby features. Histograms of edges, colors, corners and so on may form a general feature type that is passed to classifiers for object recognition. In some embodiments a first histogram may be generated during a design-time mode, and a second histogram may be generated during a runtime mode, at which time the histograms may be compared to enable such object recognition. e.g., based on similarity of histogram data.

At steps 240-255, one or more bounding shape properties for one or more of the bounding shapes (e.g., bounding shape objects) may be defined, identified, associated, received, and/or selected. Such properties may include, for example, defining anchors and controls, etc. At step 240, at least one anchor (e.g., a shape anchor) may be defined, identified, associated, received, and/or selected from among the one or more bounding shape objects. Each anchor may denote shape data selected to be used in the scene identification at runtime. A set of anchors uniquely determines a scene. An anchor may be for example an object based on a shape of which internal (e.g., child) content (e.g., contours) is constant and cannot be changed from design-time to runtime. For example, a shape of button with constant text or an image on the face of the button may be defined as an anchor as the features of the button are not expected to change from design-time to runtime and can therefore be used to recognize the application as part of a scene. In some embodiments, one or more anchors may be identified, determined, recommended, and/or suggested automatically by the processor. In some embodiments, a processor may receive one or more anchor selections as input from a user.

At step 245, at least one control (e.g., a GUI control) may be defined, identified, associated, received, and/or selected from among the one or more bounding shape objects. A control may associate a given object with a control type for which an interaction with the control is defined within the runtime stage. For example, a control type may include one of a frame window, a button, a link, a list box, a check box, a table, a drop-list, a combination box, a tab, and a slider, etc. In some embodiments, one or more controls may be identified, determined, recommended, and/or suggested automatically by the processor. In some embodiments, the processor may receive one or more control selections as input from a user. Furthermore, in some embodiments, one or more control types for selected controls may be identified, determined, recommended, and/or suggested automatically by the processor. In some embodiments, the processor may receive one or more control type selections as input from a user.

At step 250, one or more bounding shape objects (e.g., additional shape objects) may be created on the basis of a shape (e.g., a rectangle) drawn (e.g., manually marked and/or otherwise digitally added) on the image. Furthermore, the newly created shape object may be added to the shape objects tree.

At step 255, in some embodiments, one or more controls may be attached or otherwise associated to one or more anchors. By attaching controls to defined anchors, one or more geometric relationships may be defined between controls and anchors, the data of which may be used to identify controls of a scene at runtime, as described herein. In some embodiments, one or more controls may be attached to one or more anchors automatically by a processor. In some embodiments, a processor may receive attachment selections as input from a user. Furthermore, in some embodiments, one or more geometric relationships between controls and anchors may be calculated identified, determined, recommended, and/or suggested automatically. In some embodiments, a processor may receive one or more geometric relationship calculations or selections as input from a user.

Figure 7:
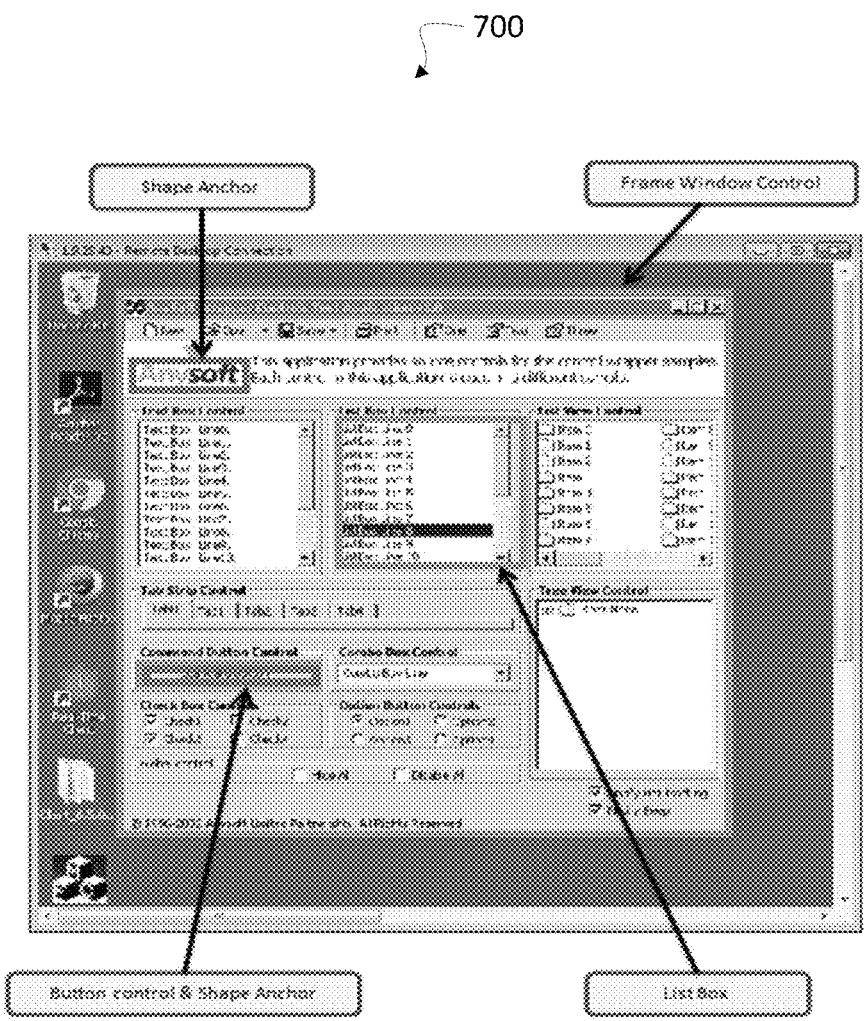
FIG. 7 is an example scene object model, according to at least one embodiment of the invention.

At step 260, data relating to one or more of the design-time application image, the one or more design-time visual objects, the one or more design-time bounding shape objects, the one or more bounding shape properties, the shape tree data, and/or the design-time histogram data may be stored, e.g., as a scene or another data object, for later recall. A scene may be for example a project object which represents an application state. It may include, for example, the captured application image, a set of anchors and/or controls, etc., e.g., defined by a user such as a project designer. A scene may provide one or more object models which may be later recalled and used during runtime to identify an application and enable the various defined controls for the application. An object model, as understood herein, may be defined as a set of properties (e.g. data stored by the control), methods (e.g. software functions that an external program may cause the control to execute), features, and/or events (e.g. software functions may be raised or fired, or the equivalent of raising or firing may be performed internal to a program, to produce output to an external program from the control) specific for an identified or given object. FIG. 7 depicts an example scene object model 700 according an embodiment of the invention. Furthermore, as shown in FIG. 8, various scene data may be provided, recorded, stored, etc., in a scene design-time data table 800 as shown according an embodiment of the invention. In some embodiments, additional scenes may be created, e.g., by capturing and processing additional application images as necessary. Otherwise, the design-time mode may end.

Figure 9:
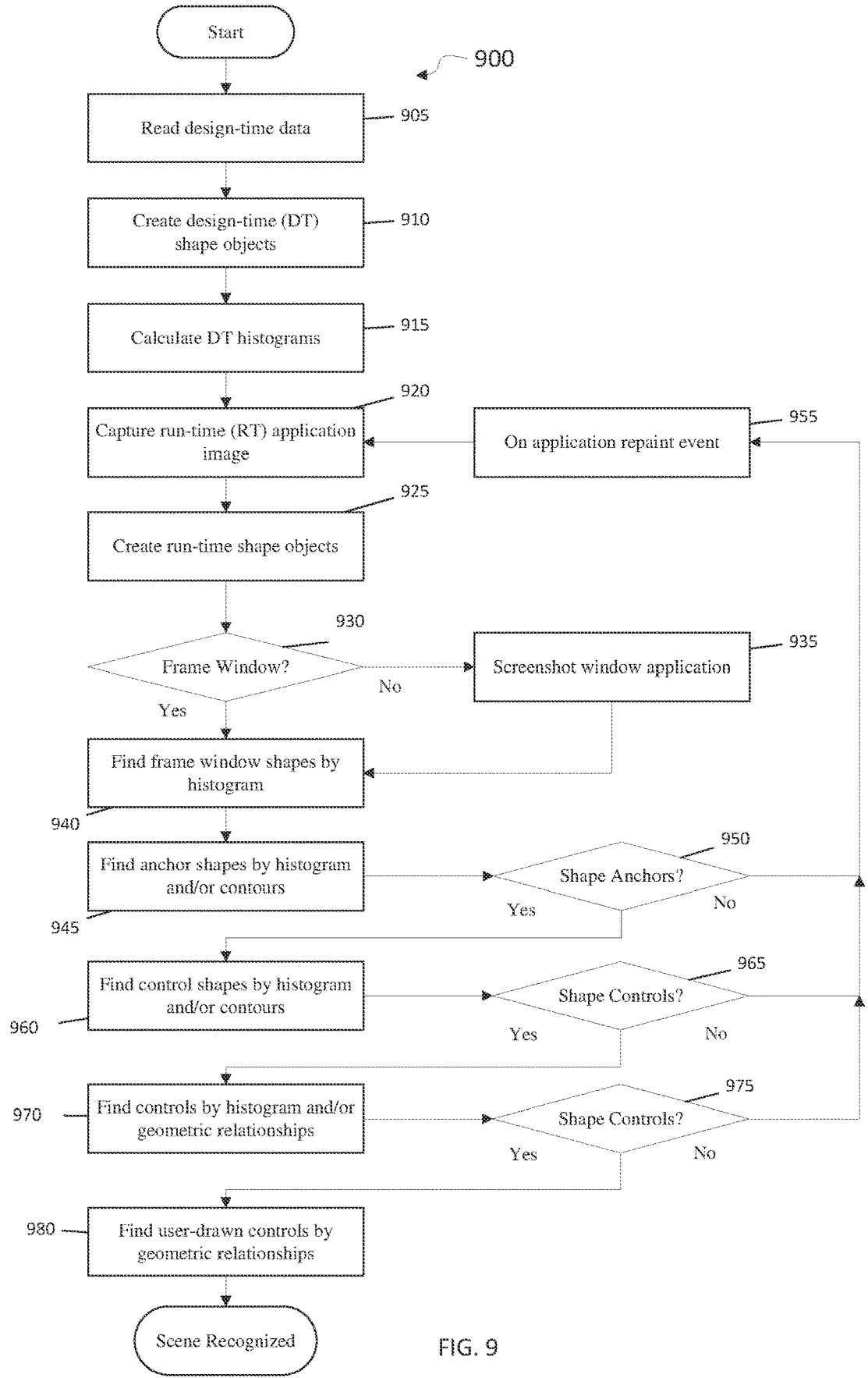
FIG. 9 is a flow diagram of a second part of a method for enabling graphic-based interoperability with a runtime application according to at least one embodiment of the invention.

To provide reliable interaction and operability with an application it may be necessary to identify the application state, particularly open windows, visible GUI elements, etc. Accordingly, embodiments of the invention enable a processor to identify the relevant application state based on the previously stored scene (e.g., scene object model and/or scene table data, etc.). FIG. 9 is a flow diagram a method for enabling interoperability with a runtime application according to an embodiment. In particular, FIG. 9 depicts a flow diagram of a method 900 for identifying an application based on detected visual elements (e.g., GUI objects or control graphic items) of the application during a runtime stage, mode, or process, according to an embodiment. In some embodiments, method 900 may be configured to implement one or more of the elements/features/functions of system 100, or another system.

At step 905 a scene (e.g., the scene stored in step 260 of FIG. 2) containing design-time data may be received, recalled, read, and/or reloaded. In some embodiments, while a client application is starting up (e.g., loading), for example, on a remote desktop environment on a client/user device, the scene may be concurrently recalled and the design-time scene data (e.g., design-time (DT) application image, anchors and controls with DT properties, threshold values, shape sizes etc.) may be read and/or loaded. Of course, in other embodiments, scene data may be preloaded even before an application is run.

At step 910, one or more design-time bounding shape objects for implementation or use during runtime may be created (e.g., recreated). In some embodiments, one or more of bounding shape objects, a corresponding shapes tree, bounding shape properties, anchors, controls, etc., may be built, generated, constructed, and/or calculated with the same or similar algorithms, processes, methods, etc., as at design-time, described in detail with regard to FIG. 2. In some embodiments, for each anchor and/or control defined in the scene during the design-time mode, a sub-image may be extracted from the design-time application image. In some embodiments, the extraction may be based, for example, on relative coordinates of the shape object with respect to an anchor or a control. Such sub-images may be used for example, to overlay and/or identify controls and/or anchors in an application during runtime. e.g., in place of bounding objects. In some embodiments, while rebuilding a project (e.g., a scene and/or one or more components of the scene) and applying it at runtime, the application image may therefore be split into a set of pieces (e.g., saved as sub-images) corresponding to the various GUI element recognized. For example, FIG. 7 depicts a List Box, Button Control, Shape Anchor, Frame Window Control, etc., which may be extracted as sub-images, which may be used as overlays during runtime creation of bounding shape objects.

At step 915, the DT Histogram may be calculated (e.g., recalculated) (e.g., as previously described in step 235). In some embodiments, the DT histogram may be calculated using a sequential call to a library such as, e.g., OpenCV to execute functions (e.g., CvCreateHist, CvCalcHist, CvNormalizeHist) to create, calculate, and normalize the histogram.

At step 920 a runtime (RT) application image may be captured, and in some embodiments may be saved or cached. Such capturing may be caused or initiated by any of one or more change triggers, depending on the embodiment, such as a timeout or expiry of a period of time, or a detected screen change or paint command, or a user input that has the potential to change the screen. As understood herein, capturing may include, for example, capturing the image of the application as a "screenshot," e.g., by use of a print-screen function or other image and/or screen capture method and/or device, or receiving a captured image of the application, e.g., from an external image capturing device, etc.

Other or different operations may take place. In other embodiments, a processor or a process may implement different methods and/or processes to take or capture the application image at runtime, depending on the application type and/or the environment in which it is running. For example, in some applications (such as the Remote Desktop application, for example) which are drawn on the screen only by image functions, the processor may be configured to intercept image paint calls (e.g., BitBlt, StrechBlt, etc.). For other applications, in some embodiments, the processor may capture a screenshot when an application repaint event arrives. In some embodiments, the RT application image may include, for example, an entire application window, a portion of an application window, an entire display including portions and/or entire windows of one or more applications, a portion of a display, etc.

At step 925 one or more runtime bounding shape objects (e.g., instantiated objects corresponding to graphically displayed controls, or internal representations corresponding to instantiated objects) may be created, for example, corresponding to, relating to, and/or associated with, one or more design-time objects, as described herein. In particular, in some embodiments, one or more RT Image bounding shape objects and/or a runtime shapes tree may be created, built, constructed, generated, and/or calculated with the same or similar algorithms, processes, methods, etc., as at design-time, described in detail with regard to FIG. 2. e.g., on the basis of one or more identified bounding shape properties as described herein. In some embodiments, the runtime state of the application may not coincide precisely or at all with the design-time state due to resizing and/or how the application appears on the screen in other environments, in other applications (windows), etc., and therefore the set of bounding shape objects and/or the shape tree may, in some embodiments, be slightly or substantially different than those generated/created during design-time. As such, in some embodiments, for each anchor and/or control, the processor may be configured to search for appropriate shapes of the suitable size and to detect tree branch overlapped shapes. In some embodiments, one or more (e.g., typically each) of the RT bounding shape objects may be generated and/or created as an appropriate type so as to expose elements and features of the scene object model, e.g., specific for each object type. In some embodiments, these RT bounding shape objects may be overlaid with corresponding sub-images so as to replicate or otherwise visually represent the correct object type of the GUI elements for which they were created.

At step 930, in order to identify the proper scene to associate with the runtime application, an attempt may be made to identify the frame window control of the runtime application, e.g., presuming it was defined in the scene at design-time. If no application frame window can be identified, at step 935, in some embodiments, just the runtime window application may be captured, e.g., via a screenshot, e.g., to detect the necessary frame window information. If a frame window control is identified, then at step 940, one or more frame window shapes in the RT application image may be searched for, detected, found, and/or identified. In some embodiments, the frame window control in the RT application image may be searched for, possibly via its associated data, e.g., by executing one or more histograms comparison functions of DT frame window control data (e.g., collected during design-time) and RT shape histograms (e.g., using the OpenCV function CvCompareHist). The comparison result may be the array of RT shape objects whose histogram values are similar.

At step 945, one or more RT anchor shapes (e.g., anchors) may be found (e.g., detected, identified). To find RT anchors in the entire scene (e.g., in the scene model and/or in the scene data) or a portion thereof, in some embodiments, a method may again execute one or more histogram comparison functions, as described above. In some embodiments, a processor may compare design-time object data to image data collected at runtime. e.g., with or without comparing histograms, depending on the instance, e.g., by comparing contours. In some embodiments, e.g., if the contours are essentially identical, a processor may continue verification of the scene.

Anchors may contain information/data regarding contours calculated for the shape content (picture, text, lines, etc.) that are typically constant; an anchor may be for example a program or application name, a logo, etc. As such, detection of matching anchors is typically an indication that a correct (matching) scene has been identified. At step 950, if no anchors are detected, then, the runtime application image may be recaptured at step 955, for example during an application repaint event or on the occurrence of another change trigger, and the process may continue with step 925. In some embodiments, recapturing the application may resolve any mismatching and/or detection issues.

If one or more anchors are found at step 945, then at step 960, one or more control shapes (e.g., controls), may be found (e.g., detected, identified) for example, based on identified anchors. In some embodiments, controls may be searched for in the same or a similar manner as anchors. To find RT controls in the entire scene (e.g., in the scene model and/or in the scene data) or a portion thereof, in some embodiments one or more histogram comparison functions may be executed again, as described above. In some embodiments, a processor may compare design-time object data to image data collected at runtime, e.g., with or without comparing histograms, depending on the instance. However, it should be noted that controls are not necessarily constant (as they typically are with anchors), and their contours may be somewhat different, and thus controls may, in some embodiments, be more readily identified via comparison of histograms.

At step 965, if no controls are detected, then the runtime application image may be recaptured at step 955, for example during an application repaint event, and the process continues with step 925. In some embodiments, recapturing the application may resolve any mismatching and/or detection issues.

At step 970, one or more control shapes (e.g., controls) may be found (e.g., detected, identified, etc.), for example, based on previously defined or identified geometric relationships. To find RT controls in the entire scene (e.g., in the scene model and/or in the scene data) or a portion thereof, in some embodiments, for example, when one or more controls have been bound or attached to a particular anchor or anchors, a processor may identify such controls based on searching geometric relationships between controls and anchors. In some embodiments, such as when one or more controls have not been bound or attached to any specific anchors, a processor may search for and detect geometric relationships between controls and any or all anchors already identified on the scene. Of course, the processor may execute one or more histogram comparison functions as well, as described above.

At step 975, if again no controls are detected, the runtime application image may be recaptured at step 955, for example during an application repaint event, and the process may continue with step 925. In some embodiments, recapturing the application may resolve any mismatching and/or detection issues.

At step 980, in some embodiments any user-drawn controls (e.g., control shapes) may be found (e.g., detect, identify, etc.). To recognize user-drawn control shapes and their respective coordinates, in some embodiments, a processor may calculate geometric relationships between the specific control and any or all other controls and anchors found on this scene.

At step 985, e.g., when all or a threshold amount of the anchors and controls defined in the scene are recognized, the scene may be marked as recognized (e.g., identified) and interaction with the GUI of the runtime application may be enabled. For example, in some embodiments, in order to realize the object model, a processor may emulate runtime control methods, properties and/or events of the design-time bounding shape objects by, e.g., generating, constructing, assigning, defining, or otherwise enabling the one or more RT bounding shape objects (e.g., instantiated objects corresponding to graphically displayed controls or internal constructs using as a model such objects such as object constructs) such that they have the same or a similar defined set of properties, methods, features, and/or events specific for an identified or given object as those of the one or more DT bounding shape objects. For example, for input emulation (mouse, keyboard, etc.) a processor may use such functions as SendInput. SendMessage and Post Message functions (e.g., for the Windows API). The processor may further use mouse and keyboard hooks (Windows API) to receive user activity events. For content change events a processor may check and identify contours changing in the control. As before, a processor may also intercept image paint calls (BitBlt, StrechBlt etc.) in order to change the application state. Turning briefly to FIG. 10, a table 1000 of example control methods, properties, and events is provided according to an embodiment of the invention.

Figure 11:
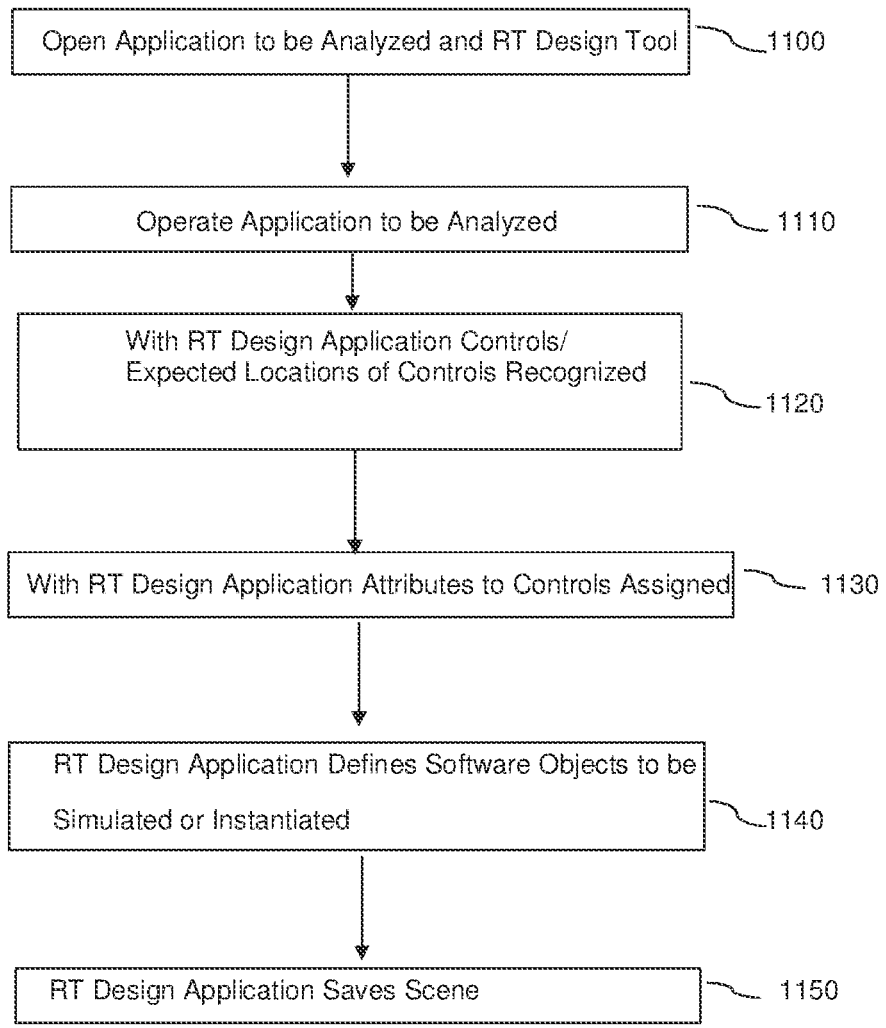
FIG. 11 is a flow diagram for a "designer" stage, for identifying and/or defining GUI objects in an application image during a design-time learning stage, according to embodiments of the invention.

FIG. 11 is a flow diagram of one embodiment for a "designer" stage (e.g. application 146 executed for example by third party server 180 or another device), for identifying and/or defining GUI objects in an application image (e.g. a client/server or monitored application such as application 142 executed on a user terminal) during a design-time learning stage, according to embodiments of the invention. Aspects of FIG. 2 may be used in conjunction with FIG. 11, and portions of the two embodiments may be combined. Application 142, shown in FIG. 1 as being executed on a client system, may also be executed on a third party system, for the purposes of making its image available to an RT design application, and for the purposes of design of RT client 144.

In operation 1100, two processes may be opened or executed on a user terminal such as third party server 180: the application to be analyzed (e.g., application 142 executed during a designer phase), and a RT design tool or application 146 operated by a designer to define for example: graphical objects or controls displayed by application 142 and to be monitored, and software objects which are to represent the graphical entities (objects, controls, etc.) of application 142. In one embodiment, the two applications may be operated side by side by the same processor, but in other embodiments the applications may be executed remotely from each other.

In operation 1110 a user may operate application 142 to operate, alter or select a control or other control graphic item displayed by the GUI of application 142, or select another GUI element of application 142. For example, a user may use input devices associated with a computer which is part of third party server 180 and click on or select a control, text box item, list item, etc. A user may cause a GUI element of application 142 to be altered, for example by typing text which appears in and thus changes or updates the appearance of a text box. A user may essentially operate application 142 to have all controls deemed relevant by the user operated and thus analyzed and defined, as per the operations below. A user may highlight or select another GUI element of application 142: for example a user may select (e.g. using a selection box or tool) an anchor of application 142.

In operation 1120, with RT design application 146, the control or GUI element operated or altered in operation 1110 may be recognized, or its expected location may be recognized, for example using tools or methods discussed with respect to FIG. 2, or other methods. A display in application 146 mirroring the GUI displayed by application 142 may indicate in highlight (e.g., a colored border) the control or GUI element operated or altered by the user in application 142.

In operation 1130, with RT design application 146, attributes may be assigned to the highlighted or recognized control operated or altered, possibly with user input. For example, a user may operate application 146 to define a recognized control as a text box, button etc., and/or may define or select a software object (e.g. as shown in FIG. 10) to correspond to the recognized control, and a user may define events, methods, and other properties for the software object. While operation 1130 may be performed with the aid of user input, all or some of operation 1130 may be performed automatically, by a processor.

In operation 1140 RT design application 146 software objects may be created or defined to be later simulated or instantiated during run time (e.g. as shown in FIG. 10) corresponding to the controls or GUI items, or may create other data corresponding to the GUI items. Such software objects may be object-oriented programming software objects. Data included in or associated with such objects may include for example an image (e.g. a graphical representation) of the control which may be used as a comparison to a runtime image of the control, and other data. If a non-control element (e.g., anchor) is operated or identified in operation 1110, it may not be the case that a software object is assigned to the element. For example, the element may be recognized for the purpose of identifying application 142 or the layout of application 142. An anchor may be used during run time for recognizing an application, recognizing a position of an application, and defining the expected other GUI elements or controls, defined by the data created at design time as existing spatially relative to the anchor. RT design application 146 may also accept user input defining software objects and may, during the design phase, provide input to controls or other elements of application 142 and view events or other changes or output occurring with respect to software objects associated with those controls.

In operation 1150 RT design application 146 may save the data created, for example as a "scene." Such data may define or control RT client 144, when it is executed. For example a scene may be compiled into a DLL used by an RT client application. In some embodiments, data created during the design phase may define how RT client 144 operates during run time, or may define or be RT client 144 itself.

Embedded or other software (e.g. embedded software or application such as RT client 144) may monitor the state of a GUI intensive client application, e.g. application 142, when the application is running. For example, RT server 188 may communicate with RT client 144 to receive input from and/or control or send instructions to monitored application 142, or cause application 142 to receive input, such as text inserted into a textbox, or controls selected or clicked, via software objects corresponding to controls within application 142.

Other or different operations may be used.

After design-time, a client application (e.g. application 142) may be run at "run time" using the design-time definitions to allow third-party software to interact with the client application without direct interaction or access to the server operating the client. In order to do this, during runtime, changes or updates in the GUI display or graphical image of the client application over time may be detected. The determination of whether there is a change to detect to relevant GUI controls or other GUI aspects of interest to the third-party software may first be made on the occurrence of a change trigger, an event or message which may signal the possibility that the client image has changed in a way relevant to a control or other change. Such a change trigger may be for example one or more of a timeout or expiry of a period of time, a detected screen change or paint command (e.g. from the OS or Windows level), and a user input that has the potential to change the screen. Other suitable change triggers may be used.

For example, a first image of the display (e.g. of target, client or monitored application 142) may be stored or cached (e.g. by RT client 144), and at some point, e.g., after a change trigger, a second image may be stored or cached, the first image in this context being a prior image and the second image being the current image. This capturing may be iterative, where the current image becomes the prior image. Based on relevant changes or updates (e.g., by detected by RT client 144), a process on a client system (e.g. user device 140) communicate changes in state or messages to a third-party system, simulating a GUI. For example, events such as TextChanged may fire in response to detected changes between a first and second image. "Firing" or "raising" an event may in some embodiments be a construct as opposed to an object-oriented raising or firing, and may simply be a process occurring within, or a simulation occurring within, a program such as RT client 144.

For example, after a potential change is detected (e.g. after a change trigger) the graphical image of the GUI may be examined to determine if there has been a change over time in the GUI as displayed which updates a control or control graphic item (or a monitored control graphic item). A change trigger may cause such an examination or search for changes: for example a timeout or the end of a repeating time period may be a change trigger. A timeout or the end of a time period may be considered a change trigger in and of itself, or in combination with a comparison of a current screen image to a past or cached screen image which results in the detection of a difference between the two images. A change trigger may include the detection of keyboard input (e.g. on the client device), the detection of mouse input or another indication that the GUI (e.g. on the client device) has changed may trigger a search for changes.

As a result of this search, actions taken by or on controls or GUI elements may be detected (e.g. a button being clicked, text being added to a text box by a user or an automatic process). Based on these actions, simulated instantiated software objects (typically operated by software or application such as RT client 144) may provide output, or the properties, state or data associated with software objects or simulated instantiated objects may change (the change typically corresponding to the change in the control graphic item): for example an event may be raised, or fire (typically a simulated event), or the data or properties reflecting text in a control may change. In some embodiments, software objects are not actually instantiated, and the objects are an internal representation or fiction that RT client 144 uses for itself to access visual on-screen objects; RT client then may communicate with a process on a third-party server the text in the GUI textbox displayed by application 142 using such internal (to RT client 144) representation. In other embodiments, data for software objects may be accessible by methods or other devices: for example, a "GetText" method associated with a text box may be called by for example a process on a third-party server, and the GetText method (e.g., operated by or part of RT client 144) may return the text in the GUI textbox displayed by application 142. Simulating the functionality of the graphical control may be based on or may be performed after detecting the type of the graphical control.

One or more different methods may be used as change triggers or signals to cause an analysis of an application display for relevant changes to the GUI or graphical image. It is noted that a change trigger may be in response to a change in the application image which does not affect a control or GUI or other event of interest, and thus a change trigger may not result in any event being raised or object properties being changed. Changes may be monitored at the level of the operating system of the computer outputting the GUI display. For example, window events hooks and sub-class window procedures for handle redraw messages for the display of application 142 may be accessed by RT client 144, and when it is detected, via these messages, that the display of application 142 by user device 140 (e.g., a graphics card on device 140) has changed, the display may be analyzed to determine which if any controls have changed. This may be performed by a detection of drawing commands altering the virtual window displayed on device 140 showing the GUI for software 142. Similarly, GDI drawing functions may be intercepted via RT client 144: for example a Redraw event may be raised when the target image or GUI is altered. GDI intercept may require a native dynamic link library (DLL) injection into the target (e.g. client, such as Citrix) application's memory space; registering system level breakpoint handlers for all API methods relevant for windows redraw; using an inter-process communication mechanism intended to deliver redraw event information; or the use of a created object which raises events with the relevant parameters on the occurrence of a redraw event. Input devices 165 of user device 140 may be monitored. For example, application 142 may monitor keyboard and mouse input via hooks, and upon indication that a keystroke or mouse movement or click has been made, the GUI may be analyzed for changes. A timer or timeout function may cause the GUI to be analyzed for changes every repeating time period, or if a certain amount of time has passed since the last check for changes.

One or more different methods may be used to determine changes or updates in a GUI display. Some of those methods are discussed above with respect to FIG. 9. Further methods are discussed below.

Monitoring of the GUI state and changes in the state may be based on real time difference calculation of two state application images, for example a cached, saved or prior image, and a current image. Differences may include for example data selection (e.g., background change, border around text, etc.) and content data changes or updates (e.g. change in text within a text box). To identify these changes a number of methods may be used. In one embodiment, three processes are used in sequence, each providing output to the next: an image common difference regions identification process, providing output to a filter background change region, in turn providing output to a filter data change regions process. In one embodiment, two different types of image changes may be detected and used: changes in data selection (e.g., check/uncheck a button), which can be detected by background or other changes; and changes in content or data (e.g., changing the content of text).

Applying an image common difference regions identification process (e.g., with mode dilate). GUI images (e.g. one before a change trigger, or an actual or suspected change in the screen, and one current) may be compared using black-white image of absolute differences calculations, such as using the OpenCV Function AbsDiff. A morphology algorithm may be used that smooths pixels shown as changed in the resulting difference image ("Difference Image"). The process may use an erode algorithm to obtain region rectangles of changes: rectangular subsets from the original image in which there has been a change. The Difference Image may be processed by the OpenCV Function MorphologyEx with the parameter ERODE to use an erode algorithm, then on the resulting image, contours may be found using for example the OpenCV FindContours Function. For each contour a bounding rectangle may be calculated (e.g. OpenCV BoundingRect Function). In one embodiment, rectangles that are below a size threshold, e.g., with width less than two pixels, are removed from the rectangle set thus obtained. A number of rectangles, indicating changes, or surrounding changed portions, may be thus produced.

The output of image differences processing (a set of rectangles) may be fed to background change regions identification, which may identify for each rectangle of the set of rectangles the type of change: data or content changing (which may cause the process to return "false"), as opposed to background changing (which may cause the process to return "true"). This process may recognize changes in black spots: if there are no black spot changes it may be determined that background has not changed. A process may eliminate the rectangles (input from common difference regions) without background changes, leaving only rectangles indicating data changes, in a background change regions identification process. For the remaining rectangles which indicate data changes, the previous cached image and the current image may be compared with respect to these rectangles: a sub-image pair of rectangles is compared using for example a common difference regions method. If any rectangles are output, a filter is used to subtract from the sub-images background changes, to return the data changes in the rectangles.

By creating software objects or control objects, for example having associated therewith methods, properties, and events, an embodiment may simulate an API to a client application. In one embodiment the software objects or control objects are not instantiated and executed, but rather such objects are used as a representation within RT client 144, for example an object construct. Thus various software objects, or control objects, may be defined at design time and used internally by RT client 144 at runtime. In other embodiments such objects may be actually instantiated. These software objects may be similar to or mimic actual Windows controls APIs. A non-limiting set of GUI visual objects and corresponding software objects or control objects is described below; other objects may be defined and used.

A generic control may define events, methods and properties which all controls may inherit, according to object-oriented methods. For example, a generic control may include the properties or methods of control coordinates relative to the application image (e.g. the location of the rectangle of the control image); the actual control image (the image of the control itself cropped from the application image); certain design time properties such as the control name, control state, and what kind of control it is, its dimensions; image preprocessing which may prepare the image for OCR, such as digital noise reduction; mouse and keyboard hook settings, which may be hooks to for example the Windows SDK; and a histogram equalization method that may perform preprocessing to improve the contrast in an image.

For example, a Button or Link object may be both a visual object displayed on a GUI and a corresponding button or link software object (or object construct used within RT client 144). Each may be similar to the standard button or link object used in many GUI environments, with some additional functionality per embodiments of the invention. As with other controls or GUI elements discussed herein, each button or link object appearing on a GUI screen may have a separate internal or "instantiated" object within RT client 144 corresponding to the button or link, or a software representation or object construct. In some embodiments, each screen object may be represented, in RT client 144, as an object construct including data and description related to the on-screen object; in some embodiments such an object construct can be thought of as similar to an instantiated object-oriented object. In general, each GUI graphic item of interest may have a separate object (e.g., object construct) corresponding to it executed, instantiated or "imaginary" within RT client 144. In addition, each object or object construct may inherit standard properties, methods and events from a generic control.

Such a button or link software object may include methods (in the object oriented programming sense) of for example Click, which may calculate the control center (the center of the rectangular image of the control) and simulate a left mouse click on the control center in order to set the focus on the associated button or link with for example the SendInput command; and Get Caption to perform OCR recognition of the caption or label of the control from the control image and return the recognized text. Such a button or link software object may include events (in the object oriented programming sense) of for example Clicked, tired on a mouse button left up within the control rectangle (the area of mouse click input). Fired events may be processes that communicate occurrences to, e.g. third party software, e.g., RT server 188. Properties (in the object oriented programming sense) of such objects may include for example, enabled\disabled. Properties may be values or data available, via the relevant object, to third party software, e.g., RT server A process to determine if the object is enabled or disabled and thus determine the property enabled\disabled may include for example: creating a 'gray' image from the control image (the displayed image of the control) with a defined color (e.g. mostly gray, or a uniform gray image) for each pixel and having the same size as the control image. This gray image may be compared to a gray reference image defined by the user at design time as having the button or control enabled or disabled. At design time, a 'dtnorm' value may be calculated which is the relative difference norm for the control's design time control image or reference image and the defined color image (e.g. the uniform gray image), for example on a pixel by pixel basis. If the design time reference image is defined as enabled, and the relative difference norm for the run time control image and the uniform 'gray' image (e.g. 'rtnorm' value) is greater than dtnorm, the button or control at run time may be defined as enabled; otherwise the button or control is defined as disabled. If the design time reference image is defined as disabled, and the relative difference norm for the run time control image and the uniform 'gray' image (e.g. 'rtnorm' value) is greater than dtnorm, the button or control at run time may be defined as disabled; otherwise the button or control is defined as enabled.

The relative difference norm may be for example a number distilled from a calculation across all pixels in compared images. Calculating the relative difference norm may be performed using for example:

$$\sqrt{\Sigma_1 (src1(I) - src2(I))^2} / \sqrt{\Sigma_1 src1(I)^2}$$

Where a square root is calculated for a sum of each corresponding pixel for src1 (e.g. the image of the control obtained at design time or run time) less the corresponding src2 (a uniform gray image) pixel squared, divided by the square root of the sum of each pixel, squared in src1.

For example, a TextBox object may be both a visual object displayed on a GUI and a corresponding TextBox software object. Each may be similar to the standard TextBox object used in many GUI environments, with some additional functionality per embodiments of the invention. Such a TextBox software object may include methods of for example Get Text, which may perform OCR recognition of the corresponding text box displayed in the GUI control image (the control image may be the graphical image displayed on the screen showing the control, a subset of the overall image) and return the text; and Set Text, which may allow the caller (e.g., a process on third party server 180) to insert text in the corresponding text box on the GUI. For example, processes such as RT server 188 on a third-party system or RT client 144 may take some control of monitored application 142 by causing text to appear in the display of monitored application 142. RT server 188 may do this using calls to software such as RT client 144. Manipulating controls by the third-party software, e.g. executed on third party server 180, may allow for example a prompt, instructions, or advice to be given (e.g., automatically) to an agent operating monitored application 142, may allow autofill of fields, or other control of monitored application 142.

TextBox software object methods may include for example GetText (obtain the text in the control using for example OCR); and SetText and AppendText, which may use windows SendInput to set or add text (respectively) to the displayed control textbox. SetText and AppendText may use a calculation of the relevant control center and may cause an execution of a LeftMouse click (set focus) call in order to bring focus to the relevant control, and such methods may use the Windows SendInput command (or a similar command, which simulates keyboard typing), and execution of {CTRL}A, and then {DEL} (select all, and then delete). SendInput or AppendText methods may thus insert or add (respectively) text into the corresponding displayed text box control.

A TextBox software object (e.g. corresponding to a graphical control allowing input of text) may include events including Text Changed, which may fire or be raised when for example RT client 144 detects that text in the text box has changed or updated, notifying for example a process such as RT server 188 on third party server 180 that text has changed. This may be fired for example when the previous control state image stored or cached is found to differ from the current control state image in a relevant way. Such a change may be detected, for example, by calculating text changes (when presented with a set of changed areas rectangles) based on relative difference of current control image (typically the graphical image displayed on the screen showing only or mostly the control) with the image stored or cached, using the Filter Data Change Regions Method described above. If rectangles are not "empty" (empty indicating no change) then an event is fired.

A CheckBox (e.g., that permits the user to make a binary choice) or RadioButton (e.g., allowing input of a choice of only one of a set of mutually exclusive options) object may be a visual object displayed on a GUI and a corresponding software object. Each may be similar to the standard CheckBox or RadioButton objects used in many GUI environments, with some changes according to embodiments of the present invention. Such a software object may include a method of, for example, GetText, which may perform OCR recognition of the corresponding text displayed in the GUI for the object control image and return the text. Such a software object may include a property of, for example, checked/unchecked. Such a software object may include an event of, for example, a checked/unchecked state change or update, typically fired on a state change or upon the mouse-left-up causing the corresponding state change, e.g. from checked to unchecked or vice versa.

An algorithm to detect a checked state change (for example for use with a CheckBox or RadioButton) may obtain a bi-level (e.g., binary) image, and apply a threshold function to compare each pixel intensity value a threshold value. Edges detection may use a Laplace operator (e.g., the Laplacian may use the gradient of images). Contours may be identified, and an approximate polygon and rectangle for each contour may be calculated. Then two regions in the CheckBox or RadioButton image may be identified: the check mark and the text. A check mark area image identified at design time (known to have a certain state, e.g., checked or unchecked) may be matched or compared with such an image updated at runtime.

A Combination Box or ComboBox object (e.g. a box containing a combination of controls, such as sliders, text boxes, and drop-down lists) may also be a visual object and a corresponding software object. Such a software object may include methods of, for example, GetText (returning text produced from OCR recognition); and Select Index (which may perform the functions of determining the location of the control center, executing a Left Mouse click (to set the focus, in order to bring focus to the relevant control) with the SendInput command to simulate a press of the down arrow in the on-screen control n times, where n is the index of selection. Methods may include SelectItem where, for an editable combo box, keyboard input may be sent for control-A (select all) then delete, and then text data and Key "ENTER" may be sent, and for a non-editable combo box only text data may be sent by keyboard simulation, followed by the enter key simulation. Such a software object may include events including Selection Changed, returning output that the selection of the object has changed or updated. This may include finding the location of the combo box item image (e.g. using a Detect Item Location algorithm); then calculation of text changes (where the text change calculation is first presented with a set of changed areas rectangles) based on a relative difference of the current state control image with the image cached, e.g. the prior image saved, using for example a Filter Data Change Regions Method described above. If the rectangles are not empty (empty rectangles indicating no change) then an event is fired.

A detect item location algorithm used with a ComboBox object may include, for example, first, obtaining a bi-level (e.g. binary) image. A threshold function may compare each pixel intensity value with a threshold value. Edges detection may be performed, for example using a Laplace operator (the Laplacian uses the gradient of images). Contour identification may be performed, and calculation of an approximate polygon and rectangle for each contour may be performed. Two regions in the ComboBox image may be identified, for example Button and Text. The selected item image may be cropped from the text area image of the control.

A ListBox object (a visual object and a corresponding software object) may include methods of, for example, SelectIndex, SelectItem and GetSelectedText. Select Index may perform the functions of calculation of or finding the control center (the center, on the screen, of the control), execution Left Mouse click (to set focus in order to bring focus to the relevant control), using a SendInput command to simulate a press of the "home" key and the down arrow (the depiction of the down arrow in the on-screen control) control button n times, to move the selection downward, where n is the index of selection. The SelectItem method may cause the simulation of an item selected in a list (e.g., third party server 180 may via RT server 188 cause a selection to be simulated, via RT client 144 in application 142). This may occur for example by extracting text with their screen or relative coordinates) by for example OCR, and retrieving the item selected by analyzing the data of the words extracted. If the item is found (e.g. if the text on the screen matches the expected text for the item to be selected) then the appropriate mouse click may be simulated (as discussed elsewhere) to select the item in the relevant application. The GetSelectedText method may return the text selected, possibly using a Selected Item Detection algorithm (discussed below) or other suitable algorithm. The Item Selected event may fire if it is determined that the item selected is different than the previously selected item; this may be detected by detecting changes in the text background color.

The Selected Item Detection algorithm discussed above may include for example creating a Histogram Equalization of the control image; performing edges detection with for example a Canny edge detector; using a Hough transform or other suitable technique for finding horizontal lines; identifying two regions in the ListBox Image, for example List box and Scroll bars areas; processing a selected rectangle with Background Change Regions Identification Method (discussed elsewhere herein), and finding lines. Then, cropping may be performed on the sub-image of the ListBox Item selected from the list box control image.

In order to control or receive input from any region of the GUI display, beyond those specified by controls, for an application (e.g., application 142), in one embodiment, any region of the GUI display or application image may be considered to be part of a Generic Control, which may have a corresponding software object. A Generic Control software object may include and fire control actions or events such as Click, Double Click, Get Text and other appropriate events to cause events on the screen of a monitored application. Such an object may include a set of identification attributes common for all other controls on the screen, as in some embodiments all controls inherit generic properties, methods and events from a common control. Such a software object may include methods of, for example. Get Text, which returns text obtained by for example OCR recognition from the control image; SendInput, which may create or synthesize keystrokes, mouse motions and clicks; and Scroll, which may for example call a Raise Mouse click function on scrollbars or emulate 'Page Up/Down', 'Up/Down' keystroke. In order to determine the location of scroll bars and scroll bar buttons, a Scroll Bars Location method or algorithm may be used. A scroll bar software object may include events of, for example, Mouse Clicked, which may fire on the occurrence of a Mouse Left Button up in a control rectangle.

A "Scroll Bars Location" algorithm, to determine the location of a scroll bar, may be used in conjunction with or as part of a Generic Control. Such an algorithm may include, for example performing a histogram equalization of the control or GUI image; performing edge detection using for example a Canny edge detector; using a Hough transform or other technique for finding horizontal and vertical lines; and identifying scroll bar buttons areas in the GUI or control image, depending on the direction of the scrolling.

At runtime any desktop application may be identified by its frame window. A visual display on an agent's monitor (e.g. on user device 140) may include a number of windows unrelated to the monitored or client application (e.g., application 142); further, the monitored or client application may appear within a "hosting" window (e.g. a Citrix window) on the agent's monitor. While a window may be found using its "handle" or other known processes using windows, this does not apply for third party software which has no access to the "hosting" window (e.g. a Citrix window) messages. If the monitored application is running in remote desktop environment, its frame windows cannot be recognized by regular window recognition methods. Thus, a monitoring process such as RT client 144 may be able to find the hosting window (surrounding the monitored application image) easily using e.g. its window handle, the typical API may not be available for the monitored application. The monitored application's "frame window" may need to be identified within the hosting window using its visual, graphical, image. For this purpose an object called Frame Control (which can be considered as Virtual Window) may be instantiated (as with other objects, "instantiated" may be the equivalent of a virtual construct used in a monitoring process). The frame control object may contain all controls and anchors defined for the application and may be found or identified by anchors and controls contained in it. Anchors may be visual aspects of the client program that do not change, such as the title of the program.

A Frame Window object may represent the monitored application and include methods such as Get Caption, which may use OCR to recognize the caption (e.g. the text area at the top of the application frame, or the topmost text) of the image. As part of Get Caption, caption and buttons locations may be searched using for example a Hough Transform technique for finding horizontal and vertical lines. A Minimize method may simulate a left mouse click with the SendInput command on the window's minimize button to minimize the client window, and a Maximize command may simulate the left mouse click with SendInput command on maximize button to maximize the window. A Close method may simulate a left mouse click with the SendInput command on close button. A Bring To Front method may bring the application window to the front if other windows are over the frame window. A Bring To Front method may determine if the application is an icon, and if so the method may set the focus on the icon, then execute or simulate an Alt-Tab keystroke which may show a list of application icons. A screenshot image may be obtained, and the icon location may be found within the image. A mouseclick may then be simulated to maximize the client application. If the Bring To Front method determines the application is not an icon, the design time image may be compared to the current frame image, and if the features match, a mouse click may be simulated to bring the client application to the front.

A frame window object may include properties such as icon, which is the Application image icon, which may be the icon (small visual representation) of the client application when it is minimized, and its icon image appears on the screen.

A frame window object may include events such as mouse clicked which may fire event on Mouse Left Button up in the control rectangle.

Figure 12:
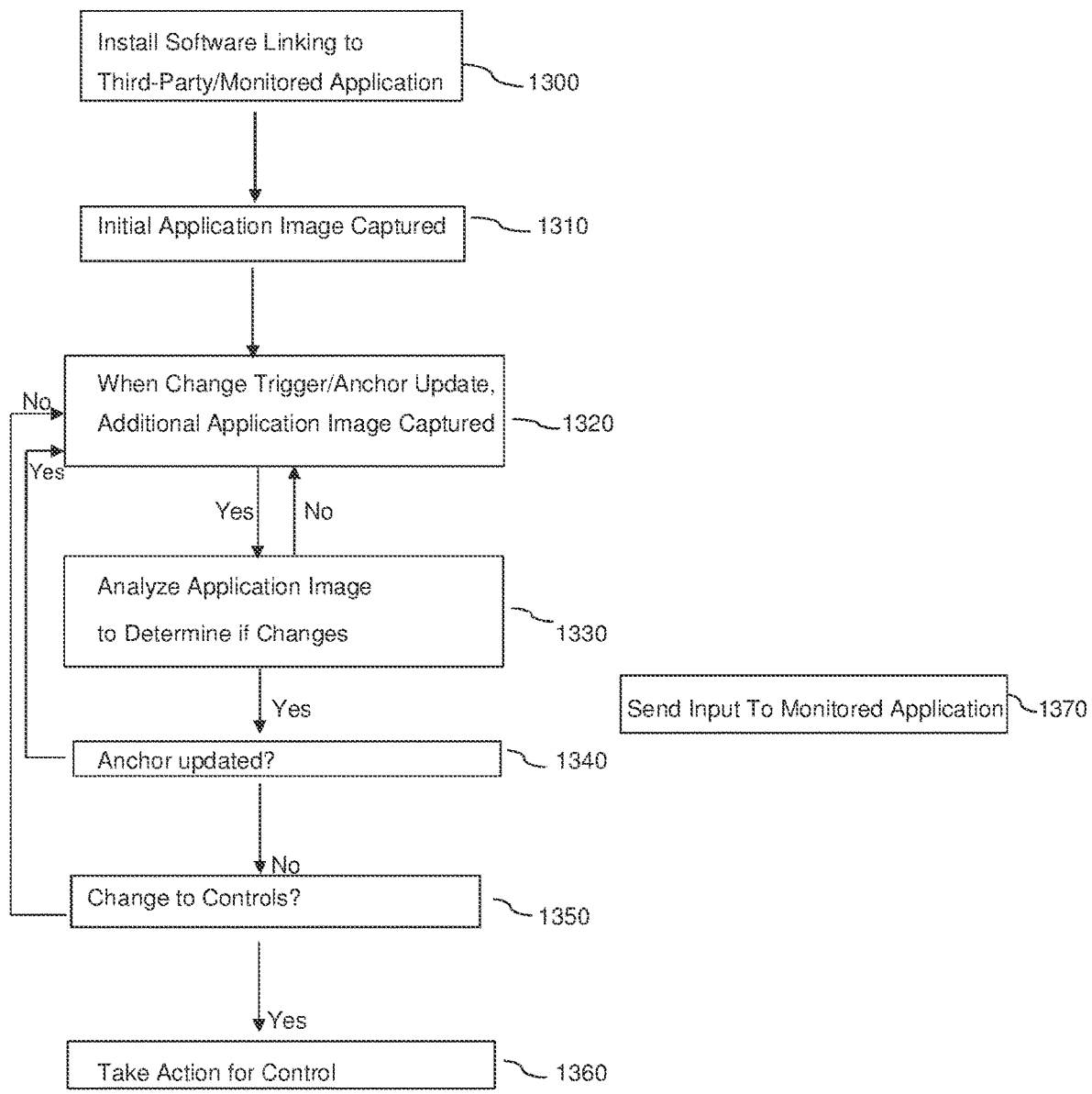
FIG. 12 is a flowchart depicting the operation of an RT client application operated side by side with client/server or monitored application on a user terminal, according to one embodiment.

FIG. 12 is a flow diagram of a method for enabling interoperability or an API with a runtime application according to an embodiment of the invention. Elements and operations of the embodiment of FIGS. 12 and 9 may be used together if appropriate, and may be used with components of FIG. 1, or another system. In operation 1300, software linking to or communicating with a third-party application (e.g., a third party application operated on third party server 180) may be installed on a user device (e.g., user device 140). For example, RT client 144, e.g. embedded software, may be installed and executed on a user device to monitor and communicate with target or monitored application 142, and to provide an API from monitored application 142 to RT server 188. Target or monitored application 142 may be considered a computer executed application operated on a computer system, and RT client 144 may also be executed on the same computer system to examine the monitored application image or GUI produced by or displayed by the target or monitored application. In one embodiment, the computer executing a remote, third party program (e.g., RT server software modules 188) and the computer executing the agent application 142 may be remote from each other, and the two applications may communicate via RT client 144.

RT client 144 may take as input a scene. In some embodiments, this may be done by compiling a scene (containing for example information regarding control images and controls) into a DLL, which may be installed on the user device 140 on which an RT client 144 executes, and the RT client 144 may access the DLL to locate and provide the interface with the objects defined by the scene. For example, a native DLL may be injected into the target application memory space; system level breakpoint handlers for all API methods relevant for windows redraw may be registered on a user device hosting the target application; an inter-process communication mechanism may be created intended to deliver redraw event information to for example software such as RT client 144 or to the third party software intended to receive the redraw information; and/or an object may be created at design time representing the relevant API which raises events with the relevant parameters for RT client 144 or to the third party software intended to receive the redraw information. The embedded software may be defined by or controlled by design time data, such as a "scene" as discussed elsewhere herein, which in some embodiments may define the actions of RT client 144 by being compiled into a DLL which is used by RT client 144.

In operation 1310, an initial application image, graphical image, or GUI display may be captured, an application image scene may be recognized. e.g. among the various windows on a received image display, the target client application image may be found, and an application image, graphical image, or GUI display may be captured and cached or stored for comparison with an image captured in the future. FIG. 9 depicts an example embodiment for such application image scene recognition. Such recognition may be performed both at start up and also if it is determined that an anchor as changed.

In operation 1320 on the occurrence of a change trigger or an indication that a screen change significant or relevant to an API may have occurred, or in the event that it is determined that an anchor was updated, an additional application image, graphical image, or the GUI display for the monitored application is captured and stored or cached. The image captured in operation 1320 may be considered the current image, and the image captured previously (e.g. in a previous operation 1320 or initially in operation 1310) may be considered the prior image; over time or iterations the current image may become the prior image. A change trigger may be for example some event or message that indicates a screen or image change has taken place that might be relevant to the API or controls on the screen. Such a change trigger can be for example one or more of the occurrence of the end of a time period or the expiration of a timer, the detection of keyboard, mouse, touchscreen or other input which may cause the change in a screen image, the capture or interception of an appropriate operating system or graphics system message, or the indication that the GUI or client display has changed. Certain embodiments may use only one of these types of change triggers, and other embodiments may combine more than one of these change trigger, and capture an image on the occurrence of any such change trigger. Other change triggers may be used.

For example, a change trigger may be the receipt by RT client 144 of a message related to a window events hook and subclass window procedure for handle redraw messages, possibly obtained from the graphics card on the client computer operating RT client 144. A change trigger may be the receipt by RT client 144 of a message intercepted from GDI drawing functions. A change trigger may be the receipt by RT client 144 of a message intercepted from monitoring keystrokes and mouseclicks, or other inputs (e.g., a press on a touch screen) on the target client computer. In other embodiments other processes, such as processes on a third-party server, may receive the change triggers.

An application image, graphical image, or the GUI display provided by a monitored application, such as application 142, may be captured or obtained, typically be monitoring software such as RT client 144. For example, a screenshot may be obtained. The application image, graphical image. GUI display, screenshot or screen image may be saved or cached for comparison with a future obtained screenshot or screen image. Typically only the image of the terminal or remote client hosting window (e.g., Citrix) is captured, as opposed to the entire image displayed on the client computer.

In operation 1330 the graphical image (e.g., the current image) of the monitored GUI may be analyzed or examined (e.g. by comparison with the prior or immediately-in-time prior captured, cached or stored image) to determine if there has been a change or update over time (e.g. by comparing the image to a previously cached image). If there is no update the process may return to operation 1320 to wait for another trigger or change event. If there is an update the process may proceed to operation 1340.

In operation 1340, if there was a change, it may be determined if an anchor was updated or changed. If it is determined that an anchor was updated, this may indicate that the change in image was for example the client application being moved, minimized, maximized, etc., and the process may move to operation 1320 to capture an image. If it is determined that an anchor was not changed, the process may move to operation 1350.

In operation 1350 the graphical image (e.g., the current image) of the monitored (UI may be analyzed or examined (e.g. by comparison with the prior or immediately-in-time prior captured image) to determine if there has been a change or update over time to controls (e.g. by comparing the image to a previously cached image), or a change over time that affects the API or the relevant monitored controls or other aspects of the client software, or since the last time the image was examined, in the GUI as displayed. In particular, examination may determine if there was a change which updates a control graphic item, or a monitored control graphic item, e.g. a change in the visual depiction of a graphical control. This may be performed, for example, by embedded software (e.g. RT client 144) installed on a client device. In some embodiments, when determining if a change occurred that affects a control, for each control, a template image determined at design time may be matched to the control images during runtime to locate each control.

If there has been no change over time, or if there is no change to control graphic items, or to monitored control graphic items, the process may wait for another trigger. e.g. iterate (operation 1320).

If there has been a change over time, or a change or update to control graphic items, or to monitored control graphic items, the process may in operation 1360 take an action with respect to the control graphic item(s) which have been determined to have changed or updated since the last image was obtained. An action may include, for example, updating or changing properties (e.g., object oriented properties accessible by querying the instantiated object, or simply data associated with an internal representation ("object construct") of a screen object) of a software object or instantiated object, or an internal representation, associated with or representing the changed control graphic items, or raising or executing an event (e.g., an object-oriented event, a function which sends a message on certain conditions where the event source—e.g., the control software object—sends a message via an event to a listener or event handlers—e.g. the third-party software) or otherwise sending a signal or message corresponding to the software object. Raising an event may include notifying a process (e.g., a portion of RT client 144, or a process external to RT client 144, such as RT server software modules 188, of the change. For example, an instantiated object or an internal construct (e.g. object construct) associated with the control that has been changed or updated may fire an event or otherwise send a message. The event may communicate information, such as the occurrence of a mouseclick or screen touch, a change in state of a window, or the change to text, to the third party application. For example, RT client 144 may communicate state changes of application 142 to a third party application executed on third party server 180, via network 105. Ways of communicating the alteration of the properties of a visual object may be used other than object-oriented event or properties techniques.

The process may continue by waiting, e.g. iterate (operation 1320), for the occurrence of a change trigger or an indication that a screen may have changed in a way relevant to a GUI.

At any point in the process of FIG. 12, in operation 1370, a third party application may affect the state or provide input to the monitored application. For example, a third party application may send a message to, call a procedure or execute a process, in order to gather information from or change the state of the monitored application. This may be done by an object oriented method call, but may be done by other software methods. For example, an application executing on third party server 180 may cause a message to a human agent to appear on the GUI output of application 142 via making a method call to a control (e.g. to an instantiated object or an internal construct associated with the control) of RT client 144.

Figure 13:
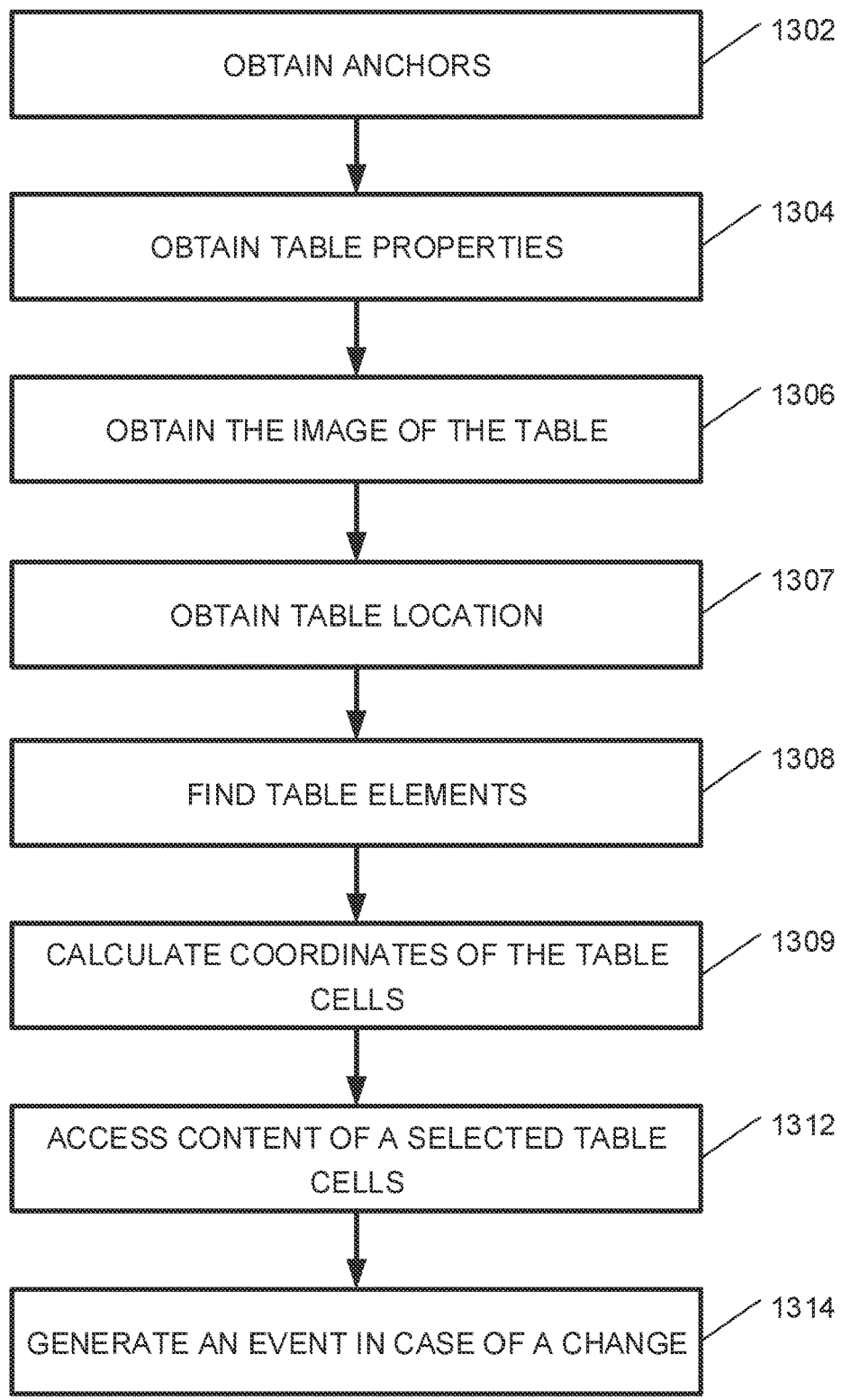
FIG. 13 is a flowchart of a method for accessing elements of a table in a digital image of the table, according to embodiments of the invention.

Reference is now made to FIG. 13 which is a flowchart illustration of a method for accessing elements of a table in a digital image of the table, according to embodiments of the invention. Elements and operations of the embodiment of FIG. 13 may be used with components of FIG. 1, or another system.

In operation 1302 at least one anchor may be defined, identified, associated, received, and/or selected from among one or more visual shapes. For example, an anchor may denote shape data selected to be used for table identification at runtime. An anchor may be or may include an object based on visual characteristics of a shape in the table. Anchors may be defined in the design phase and remain constant from the design phase to runtime. In some embodiments, one or more anchors may be identified, determined, recommended, and/or suggested automatically by the processor. In some embodiments, a processor may receive one or more anchor selections as input from a user. At runtime, a table or grid may be recognized, and its location may be determined, based on the anchors defined during the design phase.

In operation 1304 table properties may be received or obtained e.g., from a user. In some embodiments, the table properties may be obtained in a design phase, e.g., prior to runtime. Obtaining the table properties in a design phase prior to runtime may enable fluent operation of embodiments of the invention in runtime. In some embodiments, table properties may be obtained during runtime, e.g., by opening a dialog box with the user. Tables may have different visual representations. For example, a visual representation of a table may or may not have horizontal gridlines or separators, may or may not have vertical gridlines or separators, may or may not have row header, may or may not have column header, may or may not have row header gridline or separator, may or may not have column header gridline or separator, table direction may be from right to left or from left to right, and the table may have a single line of text in each cell or more than a single line of text in each cell. Other visual properties may be used. As disclosed herein, a different fragmentation method may be suitable for different visual representations. The properties obtained from the user in operation 1304 may include visual properties of the visual representation of the table, and may provide description of the visual representation. For example, the digital table image visual properties may include at least one or all of:

has row separators—may indicate whether a visual representation of a table has or does not have horizontal gridlines or separators.

has column separators—may indicate whether a visual representation of a table has or does not have vertical gridlines or separators.

has row header—may indicate whether a visual representation of a table has or does not have a row header.

has row header separators—may indicate whether a visual representation of a table has or does not have row header gridlines or separators.

has column header—may indicate whether a visual representation of a table has or does not have a column header.

has column header separators—may indicate whether a visual representation of a table has or does not have column header gridlines or separators table direction—may indicate whether the direction of the table is from left to right or from right to left.

single line—may indicate whether each cell of the table includes a single line of text or more than one line of text.

Other visual properties may be obtained and used.

The table properties may also include table selection mode, e.g., whether during runtime the user may select a single cell or box, a row or a column of the table. For example, some applications (e.g., monitored application 142) may enable only cell selection, only row selection or only column selection. Some applications (e.g., monitored application 142) may enable a combination of cell section, row selection and column selection. The table selection mode may specify which type of selection mode is supported by monitored application 142 and may enable the user (e.g., the user accessing the table using a third-party software) to use the same selection mode in runtime.

Figure 15A:
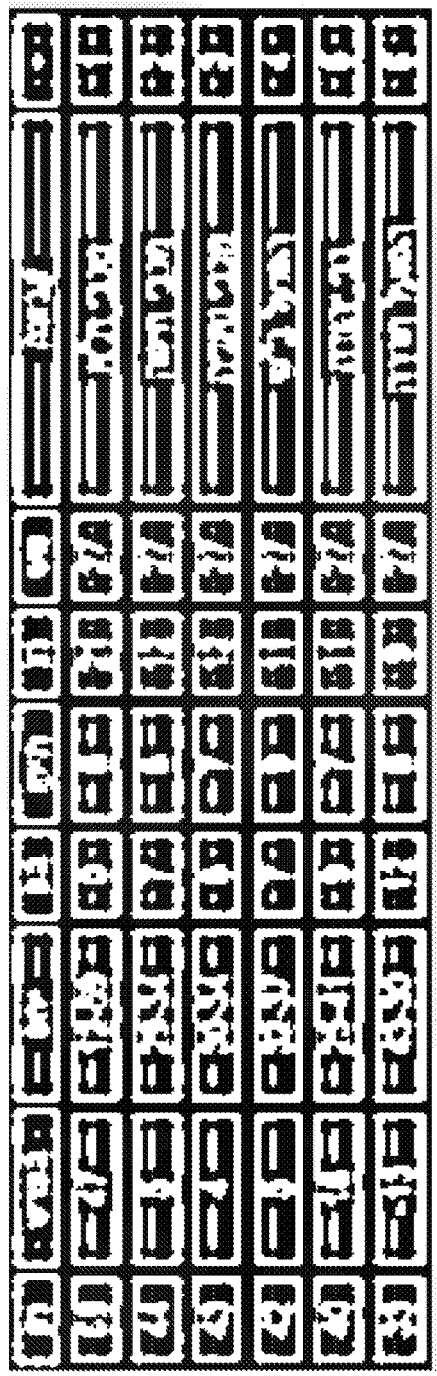
FIG. 15A depicts a digital image of a table, helpful in explaining embodiments of the invention.

The table properties may also include a fragmentation or division method. According to some embodiments, obtaining or receiving a fragmentation method may be done based on a user selection. In some embodiments, a fragmentation method may be selected or determined automatically by the processor. The fragmentation methods may include an orthogonality filter method, a gridlines detection method, a morphology detection method, a table skeleton method, a cartoonizing method and OpenCV Fast Line Detector method (FastLineDetector). Other fragmentation or division methods, or a combination of fragmentation methods may be selected and used. Fragmentation may refer to the process of identifying, detecting or finding table elements (e.g., gridlines, boxes) in the digital image of the table, or dividing the table into boxes. This process may not be trivial since tables may be presented in a variety of ways. An image of a table, may or may not include horizontal separators or gridlines, vertical separators or gridlines, row and/or column headers that may or may not have separators or gridlines, a table direction may be from right to left or from left to right, etc. For example, the table presented in FIG. 15A includes both vertical and horizontal gridlines, while the table presented in FIG. 18A does not include vertical and horizontal gridlines, but includes row header gridlines. For example, a fragmentation method that may detect table elements. e.g., gridlines, in an image of a table that includes gridlines or separators, such as the table presented in FIG. 15A, may perform poorly when used with a table that does not include gridlines or separators, such as the table presented in FIG. 18A. In addition, more than one fragmentation method may be used for fragmenting a single table. For example, if a table image includes vertical separators but does not include horizontal separators, a first fragmentation method may be used for finding the vertical gridlines and a second fragmentation method may be used for finding the horizontal gridlines. Similarly, a first fragmentation method may be used for finding the header gridlines and a second fragmentation method may be used for finding the horizontal and vertical gridlines of the table cells, etc. An example of a method for selecting a fragmentation method, as disclosed hereinbelow with reference to FIG. 19. Other methods may be used. The table properties may also include other parameters required for operating the selected fragmentation method, such as threshold levels and other parameters as may be required by the application. Anchors and properties may be generated in a design phase and stored in a table object model that may be retrieved and used in runtime.

In operation 1306, a digital image of the table, e.g., an image of the table that is part of a GUI, may be obtained or received, e.g., during runtime. For example, the image of the table (e.g., digital image 148) presented by a GUI of an application (e.g., application 142) on a computer, e.g., a client device (e.g., user device 140), may be obtained or received by a computer or processor, e.g., the same computer (e.g., user device 140), or a remote computer (e.g., server processor 185) to be used by an second application (e.g., RT client 144 or RT server software modules 188) intended to interact with the table.

In operation 1307, a location of the table in the digital image of the table may be found obtained or calculated. A location of the table in the digital image of the table may refer to coordinates of a known point of the image relatively to the digital image, for example the x and y coordinates of the top left corner of the table. In some embodiments, the location of the table may be determined in runtime based on anchors (e.g., shape anchors) related to the table, that were defined in a design phase. Obtaining anchors in a design phase prior to runtime may enable automatic detection of the table during runtime. In some embodiments, table location may be obtained during runtime, e.g., by obtaining a marking of the location of the table from the user, e.g., by marking a predefined point of the image, for example the top left corner of the table.

In operation 1308, table elements may be found, located recognized or detected in the digital image of the table in runtime. The table elements in the digital table image may be found, located recognized or detected based on digital table properties. The table elements may include components of the table that define or delimit the location of content inside the table, and may define or identify the table boxes or cells. For example, table elements may include gridlines (e.g., location or coordinates of the gridlines) of the table. Location of the table cells may be extracted from the gridlines by calculating intersections or crossing points of vertical and horizontal gridlines. In some embodiments, coordinates or location descriptions of text blocks or sections in the table may be found, located recognized or detected. Location of the table cells may be extracted from or be equal to the location of the text blocks. According to embodiments of the invention, determining or finding table elements in the table image may be performed using a fragmentation method. e.g., the fragmentation method selected in operation 1304. In operation 1309 coordinates or locations of the table cells may be determined or calculated. For example, after gridlines of the table are detected cell coordinates may be located based on or by calculating intersections of the detected horizontal and vertical gridlines. Properties of the table image may be considered as well, for example, a first row of a table may be regarded as a header cell or a data cell based on the "has column header property". Operations 1308 and 1309 may be referred to herein as cell fragmentation, table fragmentation or fragmentation.

After fragmentation, data in the cells of the table may be accessed or extracted, as indicated in operation 1312. Accessing table cells, or interacting with table data, may include performing at least one operation on the table data, and may be determined using the coordinates of a selected element. After fragmentation, locations of cells in the digital image of the table may be known, and cells may be organized in rows and columns. Headers may be defined based on the table properties. The table may be indexed, e.g., assigned with row numbers and column numbers. Thus, each cell in the table may be identified by the row and column index. Operations may include for example (other operations may be used):

Get row count—returns the number of rows in the table.

Get column count—returns the number of columns in the table.

Get cell text—returns text of a specified cell, defined for example by row and column indexes. The text may be provided using optical character recognition (OCR) for converting the image of the cell content into text.

Set cell text—inserts or writes text into a specified cell, defined for example by row and column indexes.

Click cell—emulates mouse click on the cell at the specified row and column indexes.

Get row cells—returns text of all cells in a specified row, defined for example by a row index. Text image may be converted to text using OCR.

Get column cells—returns text of all cells in a specified column, defined for example by a column index. Text image may be converted to text using OCR.

Get selected row index—returns the index of a selected row, e.g., clicked by a mouse on the digital image of the table. For example, using the detect selected item method.

Get selected column index—returns the index of a selected column, e.g., clicked by a mouse on the digital image of the table. For example, using the detect selected item method.

Get cell image—returns a picture object or a processed picture object of a selected cell. e.g., clicked by a mouse on the digital image of the table.

Paste cell—pastes text from clipboard to a cell with a given row and column indexes.

Copy cell—copies text from a cell into the clipboard for the given row and column indexes.

Get row cells—returns text of all row header cells. Text image may be converted to text using OCR.

Get column cells—returns text of all column header cells. Text image may be converted to text using OCR.

Header click—emulate mouse click on the cell at the specified header.

In operation 1314 an event may be initiated, triggered, raised or generated, for example in response to a change in the digital image of the table that was not generated by third party server 180. For example, the user of user device 140, application 142 or system server 110 may generate a change in digital image 148 of the table. A change in the digital image of the table may include change in a graphic item of the table, including clicking on a cell with a mouse, moving the cursor between cells, moving the table on the screen or window where the table is presented, resizing the table, e.g., zooming in or zooming out, changing the content of the table, e.g., deleting text, writing text, adding or deleting rows or columns, etc. Generating, triggering or raising an event may include determining that a state of the table graphic item has changed notifying a process (e.g., a process within or part of RT client 144, or a process external to RT client 144, such as RT server software modules 188) of the change. For example, the application image may be monitored at runtime by, for example, periodically capturing the application image, e.g., using timer ticks. Each new captured image may be compared with the previous one to detect changes. The notification may include parameters such as event type, row and column indexes, etc. For example, events may include (other events may be used):

Cell clicked—generated in response to a mouse click on a cell. Event parameters may include for example event type, and the row and column indexes of the clicked cell.

Cell content changed generated when a cell image has changed.

Selected change—generated when a cell, a row or a column changes, depending on the selection mode property. For example, using the detect selected item method.

According to some embodiments, detect item selection method may include detecting if an item has been selected in the table by the user of application 142. A selected item may include a cell, a row or a column, depending on table selection mode, and defined in the design phase and/or in operation 1304. The selection detection algorithm may be based on row, column, cell mean color difference between captured table images (between current and previous captures table image):

If the table image is colored, then mean colors may be calculated for each cell.

The mean colors may be converted from red, green and blue (RGB) format to hue, saturation, value (HSV) format. Cells with maximum color saturation may be found, located or detected. In many applications, the cells with maximum color saturation may be the selected cells. Other method for identifying selected cells based on changes in cell color may be used, depending on the visual characteristics of the table.

If the table image is gray, darker or brighter cells may be found, located or detected and identified as the selected cells.

Selected cells may be merged to row(s) or column(s) if needed, depending on the table selection mode property. For example, if the table selection mode is "select rows only" then selected cells may be merged into a selected row.

In order to build a table object model (e.g., in the design phase) and to interact with the table in runtime based on a digital image of the table, a process may fragment or divide the table image into tables parts such as headers, rows, columns and cells. The table fragmentation process may include finding coordinates of each table fragment like cell, row, column and their indices. There may be several table types: non-gridded, gridded, with header, without header, with rows/columns separated only, with different contrast/brightness, background colors/images. Following fragmentation methods may be suitable to fragment various table types.

As noted herein, the fragmentation methods may include an orthogonality filter method, a gridlines detection method, a morphology detection method, a table skeleton method, a cartoonizing method and OpenCV fast line detector method (FastLineDetector). This list is not limiting and other fragmentation methods, or a combination of fragmentation methods may be selected and used. Fragmentation methods used may be based on combination and superposition of the above listed methods or part of them to get coordinates and data of cells, headers, rows and columns.

According to embodiments of the invention, the orthogonality filter method may be suitable for table images that include gridlines. The orthogonality filter method may include for example:

converting the digital image of the table to a grayscale image.

applying a horizontal discrete differentiation operator to the grayscale image to calculate a horizontal derivative, dx, and a vertical discrete differentiation operator to obtain a vertical derivative, dv, for pixels of the grayscale image. The horizontal derivative and the vertical derivative of a pixel form a two-dimensional (2D) derivative vector of the pixel. For example, the discrete differentiation operator may be or may include OpenCV Sobel operator (Sobel).

Calculating magnitudes and angles of the 2D derivative vectors of the pixels of the grayscale image. For example, the magnitude and angle may be calculated by:

$$\text{Magnitude} = \sqrt{dx^2 + dy^2}$$

$$\text{Angle} = \tanh\left(\frac{dy}{dx}\right)$$

Other equations may be used.

Figure 14B:
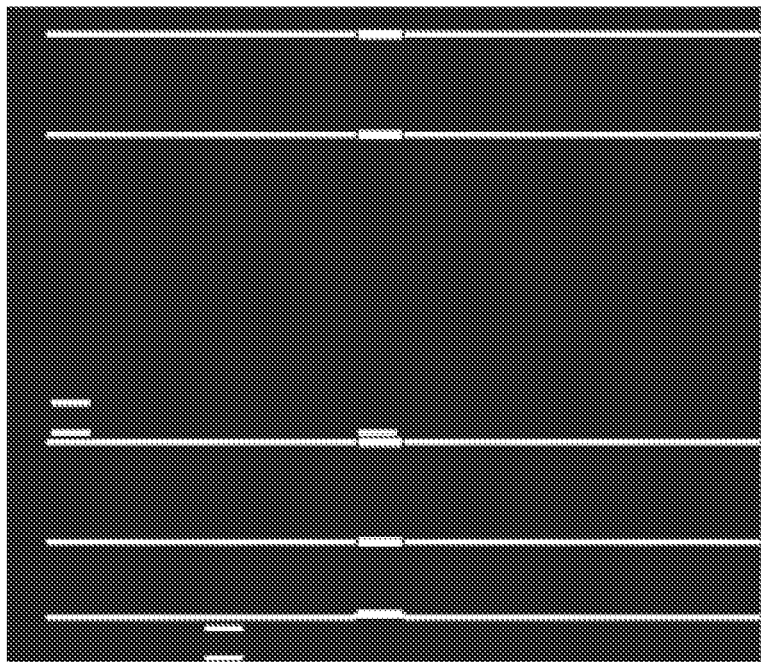
FIG. 14B depicts a binary image including vertical gridlines marked in white, that is obtained after applying the orthogonality filter method on a digital image of a table, according to embodiments of the invention.
Figure 14A:
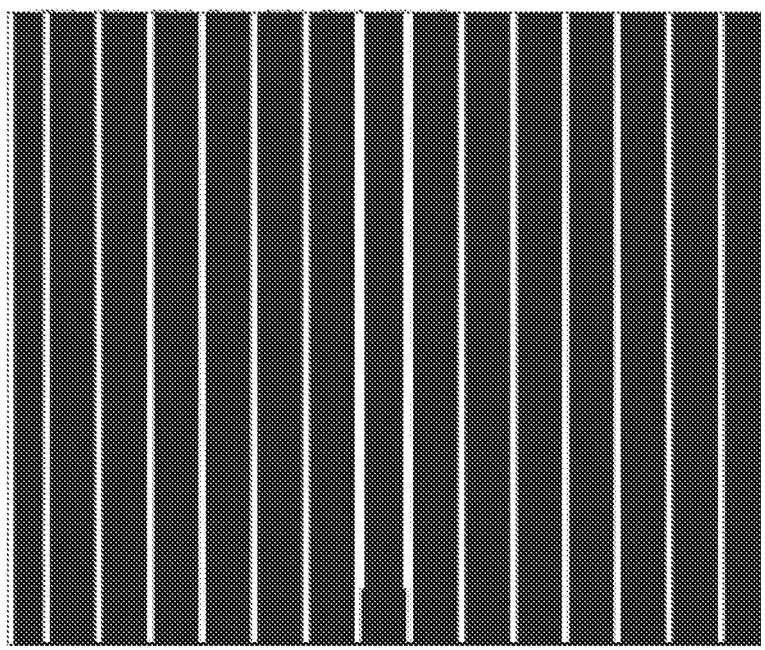
FIG. 14A depicts a binary image including horizontal gridlines marked in white, that is obtained after applying the orthogonality filter method on a digital image of a table, according to embodiments of the invention.

Marking pixel (i,j) as pertaining to a gridline if the pixel (i,j) and its (i+1,j) and (i,j+1), (i+1,j+1) neighbors are orthogonal, e.g., perpendicular, to each other, where i is a horizontal index of a pixel in the digital image of the table and j in the vertical index. For example, in a binary image, e.g., an image with only two colors, for example a black and white (B&W) image, all pixels may be marked with a first color and pixels that have orthogonal neighbors as defined above may be marked with the second color. Other terms on the 2D derivative vectors may be used. FIGS. 14A and 14B provide an example of a binary image obtained after applying the orthogonality filter method. FIG. 14A shows horizontal gridlines marked in white in a B&W image, and FIG. 14B shows vertical gridlines marked in white in a B&W image.

Extracting coordinates of the vertical and horizontal gridlines.

According to embodiments of the invention, using a Cartoonizing method may sharpen the table image and the make the colors of the image more saturated, comparing to the original image of the table. A Cartoonizing method may help to identify edges in the image of the table. A Cartoonizing method may include applying an edge detection algorithm, such as the OpenCV Laplacian edge detector (a second order derivative), that is extremely sensitive to noise. To remove noise before and after the second order derivative a sequence of image transformations may be performed. A cartoonizing method may include for example:

Downsampling or zooming in the digital table image to remove noise. For example, downsampling may be done using the OpenCV Pyramid function (PyrDown). Other filters may be used to remove noise.

Performing edge detection on the down sampled image to detect edges, e.g., using a second order derivative such as the Laplacian edge detector.

Applying a bilateral filter to obtain a filtered image. This operation may remove edges that are not gridlines. According to some embodiments, a bilateral filter may be applied to each color channel independently and the results may be unified to a single filtered image.

Upsampling or zooming out of the filtered image to obtain a zoomed-out image. For example, upsampling may be done using the OpenCV Pyramid function (PyrUp).

Smoothing the zoomed-out image by applying a median filter with n×n aperture, where n is an odd number, to obtain a of smoothed image.

The smoothed image may be converted into a grayscale image.

Converting the grayscale image to a binary image with an adaptive threshold using threshold adjusting parameters defined at design-time, for example using the OpenCV adaptive threshold function (adaptiveThreshold) with parameters defined at design time.

Figure 15B:
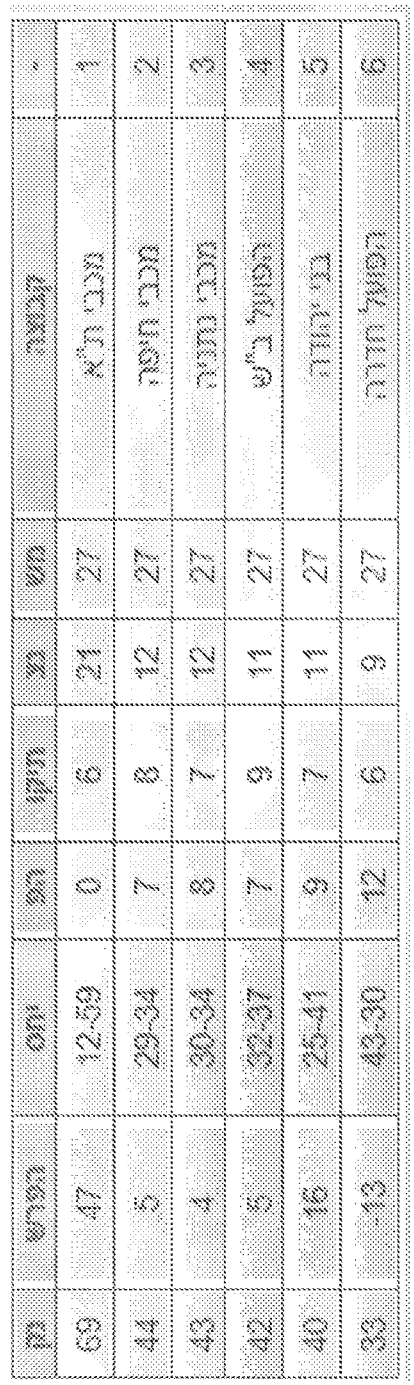
FIG. 15B depicts an example of a binary image obtained after applying the orthogonality filter method, according to embodiments of the invention.

Resizing the binary image to the original image size to obtain a resized binary image. FIG. 15B depicts an example of a binary image obtained after applying the orthogonality filter method to a table presented in FIG. 15A.

Applying the orthogonality filter method disclosed herein to the resized binary image to obtain coordinates of the vertical and horizontal gridlines.

Figure 16B:
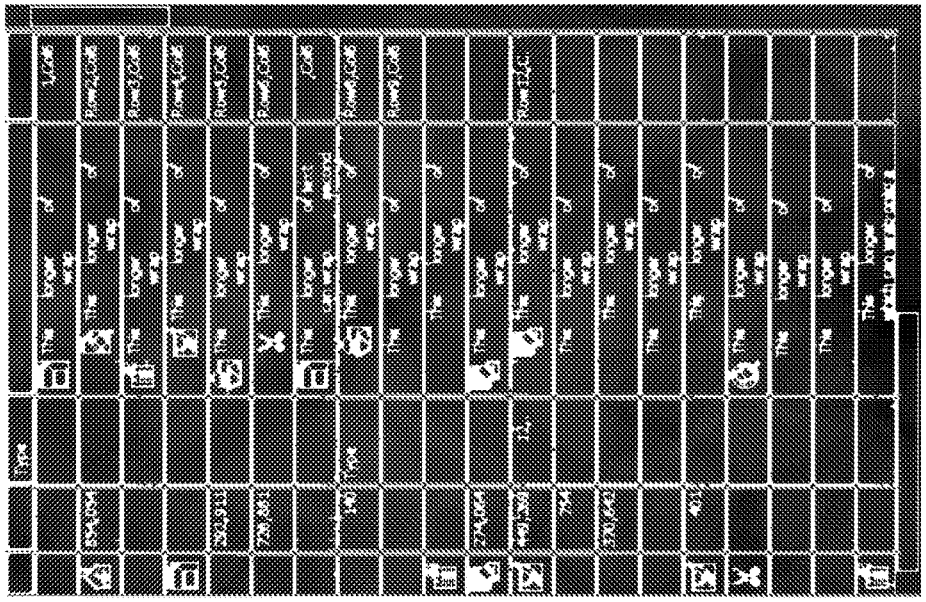
FIG. 16B depicts horizontal and vertical gridlines obtained after applying gridlines detection method on the table image depicted in FIG. 16A, according to embodiments of the invention.
Figure 16A:
FIG. 16A depicts another digital image of a table, helpful in explaining embodiments of the invention.

According to embodiments of the invention, a gridlines detection method may include building grid mask and extracting horizontal and vertical gridlines from the mask. The gridlines detection method may include for example:

Building grid mask by:
Converting the digital image of the table to a grayscale image.
Blurring the grayscale image by applying a gaussian blur function to obtain a blurred image;
Thresholding the blurred image to obtain a binary image;
Scanning the binary image to obtain a pixel that is connected to a maximal number of pixels with a given color, for example, using the OpenCV floodFill function.
Filling the connected pixels with a first color and the rest of the pixels with a second color to generate a mask, for example using OpenCV floodFill function FIG. 16B depicts an example of horizontal and vertical gridlines and vertical gridlines, respectively, obtained after applying gridlines detection method on table image depicted in FIG. 16A.
Extracting coordinates of the horizontal and vertical gridlines from the mask.

Figures 17A, 17B:
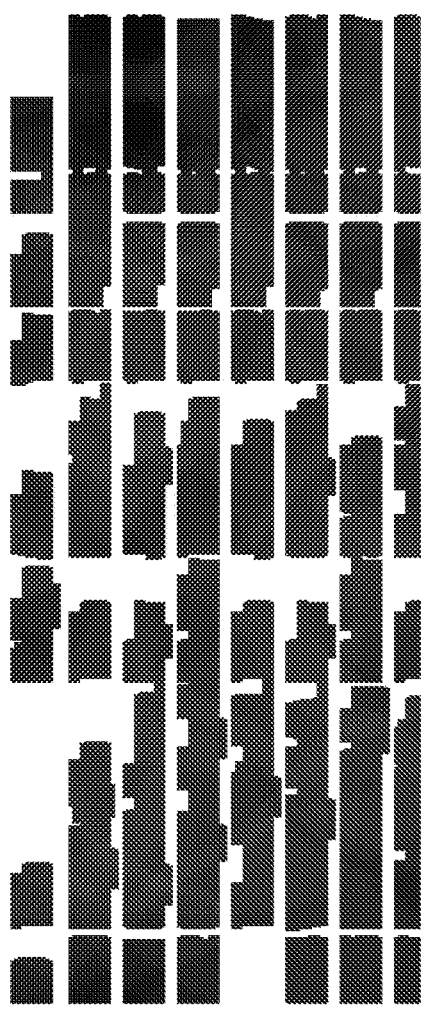
FIG. 17A depicts an example of a table after performing morphological image processing using a structuring element, according to embodiments of the invention.
FIG. 17B depicts the table image used for the example depicted in FIG. 17A with the identified contours, according to embodiments of the invention.

According to embodiments of the invention. A morphology detection method may include for example:
Thresholding the digital image of the table to obtain a binary image.
Blurring the binary image to obtain a blurred image.
Performing edge detection on the blurred image.
Obtaining a structuring element, for example, using OpenCV Get Structuring Element function (GetStructuringElement). The OpenCV GetStructuringElement function may return a structuring element of the specified size and shape for morphological operations. For example, the size and shape and other parameters of the parameters GetStructuringElement function may be defined in the design phase.
Performing morphological image processing using the structuring element, to find geometry shapes, for example, using OpenCV morphologyEx function. The OpenCV morphologyEx function may perform morphological transformations. FIG. 17A depicts an example of a table after performing morphological image processing using the structuring element.
Identifying contours of the geometry shapes using a contour approximation method, for example using the OpenCV method FindContours function. The contours may provide an approximation of polygonal curves and may represent text blocks in the table image. FIG. 17B depicts the table image with the identified contours. It can be seen that the contours surround text blocks in the table image.
Generating vertical and horizontal lines between the table blocks, where the vertical and horizontal lines form the gridlines of the table image.

Figures 18A, 18B:
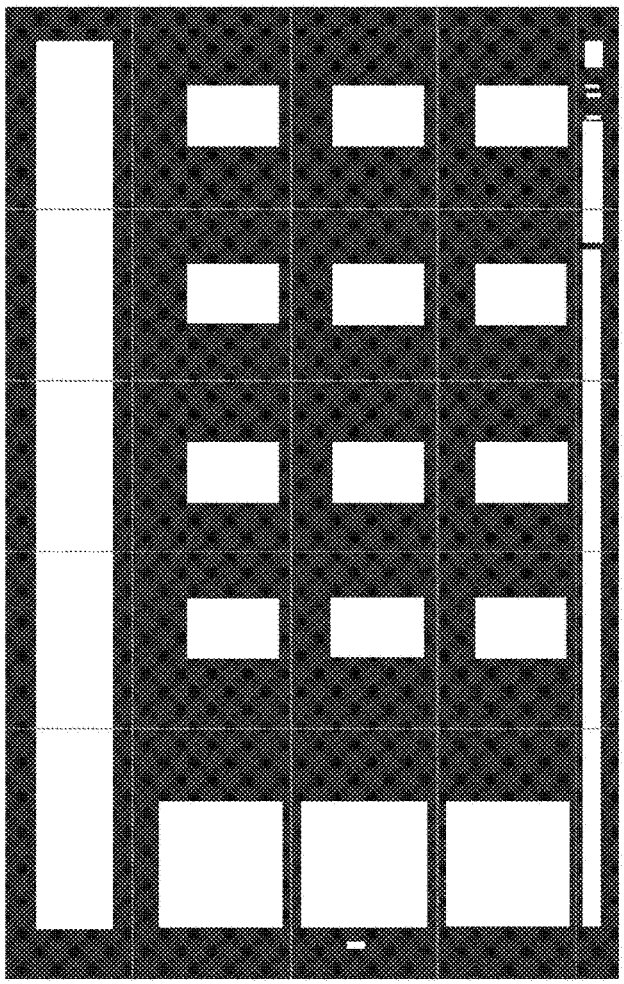
FIG. 18A depicts another digital image of a table, helpful in explaining embodiments of the invention.
FIG. 18B depicts an example of contours that represent text blocks in the table image presented in FIG. 18A, according to embodiments of the invention.

According to embodiments of the invention, a table skeleton method may include for example:
Applying a Laplacian filter to the table image to obtain filtered image or an array or matrix of floating-point values.
Normalizing the filtered image or the array of floating-point values to obtain a color image with pixel values in predetermined range. e.g., 0-1.
Thresholding the color image to obtain a binary image.
Blurring the binary image to obtain a blurred image.
Calculating contours of a first color, e.g., white, in the blurred binary image, where the contours represent text blocks in the table image. FIG. 18A depicts a table image and FIG. 18B depicts an example of contours that represent text blocks in the table image presented in FIG. 18A.
Generating vertical and horizontal lines between the table blocks, where the vertical and horizontal lines form the gridlines of the table image.

Figure 19:
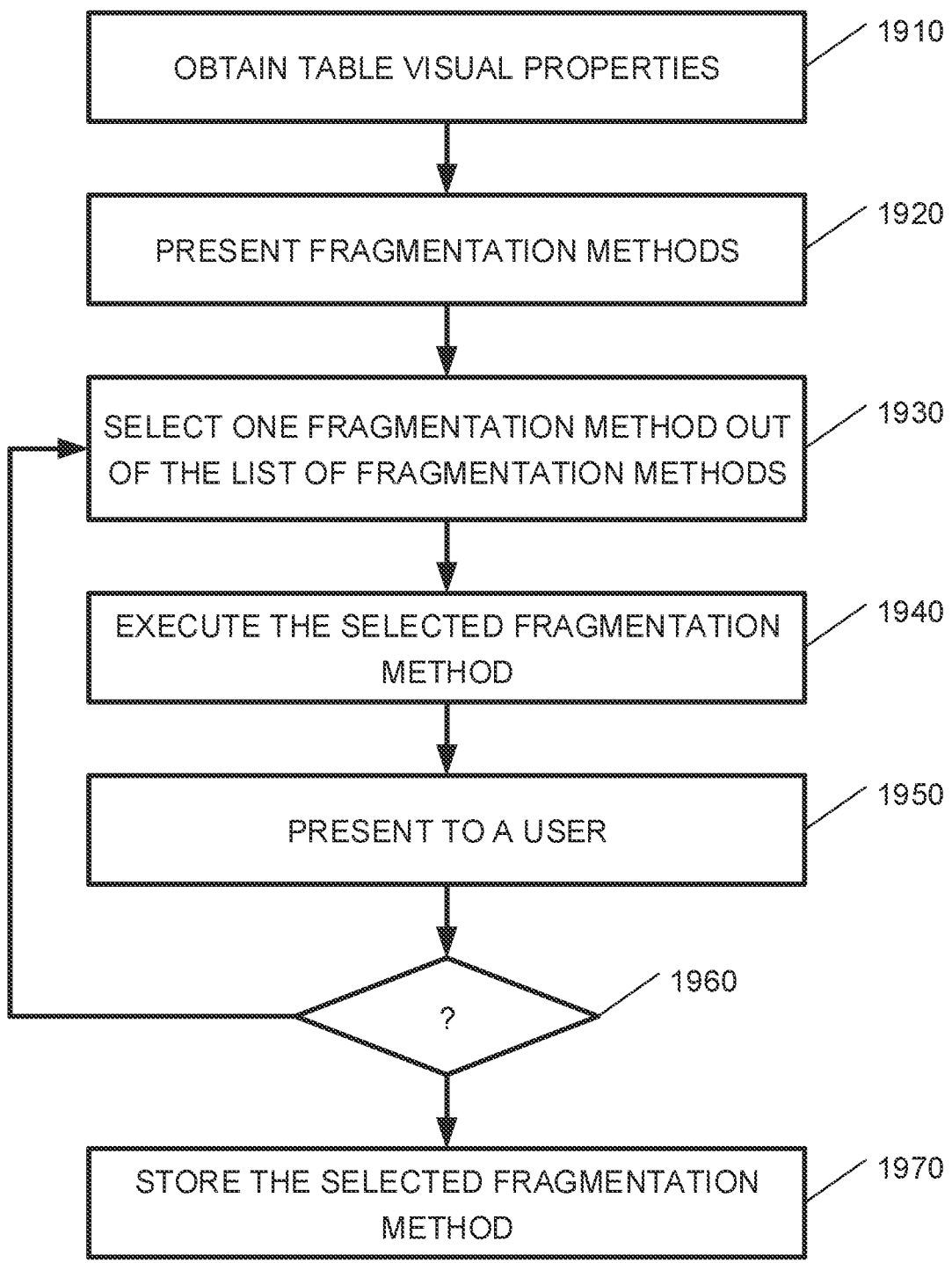
FIG. 19 is a flowchart illustration of a method for selecting a fragmentation method, according to embodiments of the invention.

Reference is now made to FIG. 19 which is a flowchart illustration of a method for selecting a fragmentation method, according to embodiments of the invention. Embodiments of the method for selecting a fragmentation method may be performed in a design phase and may be an elaboration of operation 1304 depicted in FIG. 13. Elements and operations of the embodiment of FIG. 19 may be used with components of FIG. 1, or another system.

In operation 1910 the table or grid visual properties may be obtained as disclosed herein. According to some embodiments of the invention, the table visual properties may be obtained from a user, e.g., a system designer in a design phase. According to some embodiments of the invention the table visual properties may be obtained from a user during runtime. A representative image of a table, e.g., a table with arbitrary content and similar visual properties to those used during runtime, may be presented to the user, for example in a design phase. The user may provide the table visual properties according to what he sees in the image of the table. An example of a table and a dialog box in which the user may type in the properties of the table is provided in FIG. 23. In operation 1920, a list of fragmentation methods may be presented to the user. In some embodiments the list may include all the supported fragmentation methods. In some embodiment the list may include a subset of (e.g., one or more) fragmentation methods that may be selected based on the obtained visual properties. For example, some fragmentation methods may be appropriate for tables with gridlines, while others may be appropriate for tables without gridlines. Thus, a subset of fragmentation methods that match the visual properties of the table may be selected by the system and presented to the user. For example, the subset may include the morphology detector method and table skeleton method for non-gridded tables.

The fragmentation methods may be presented to a user, e.g., in a scroll down menu, to the user. In operation 1930 one or more fragmentation method out of the subset of fragmentation methods may be selected, by the user or automatically by the system. For example, a user may select one fragmentation method for the table, or a user may select a first fragmentation method for the horizontal gridlines and a second fragmentation method for the vertical gridlines, etc. Such a selection may be received by the system. In operation 1940 the selected one or more fragmentation methods may be performed or executed to find table elements in the representative table image. In operation 1950 the results may be presented to the user. For example, the same table with the detected table elements marked on or beside the table may be presented to the user (see for example FIGS. 19A and 1913 presenting a table and the detected gridlines, respectively). The user may then judge the results and decide, as indicated in operation 1960 whether the selected algorithm provide good results or whether he would like to try another algorithm form the subset of fragmentation methods and go back to operation 1930. Such a selection may be received by the system. In some embodiments the user may select and adjust values of various parameters elated to the fragmentation method, such as threshold values. If the results or satisfactory (or in case all fragmentation methods in the subset were used, is the best possible), the method may proceed to operation 1970 and the selected one or more fragmentation method, and parameter values if applicable, may be stored together with other required table properties, e.g., in a project, to be used at runtime. Other methods for selecting a single fragmentation method may be used.

According to embodiments of the invention, a method for accessing elements of a table in a digital image-of the table may be divided to design phase and runtime phase. For example, in a design phase a scene, or a table object model may be generated or created. A scene may refer to an object which represents the application state. The scene may include a captured application's window image (optional) including a representative table and a set of anchors and table properties. The scene, or the set of anchors and table properties generated at the design phase, may be stored and used at runtime phase. During runtime, a third-party process may interact with or access the table data using the set of anchors and table properties generated at the design phase.

Figure 20:
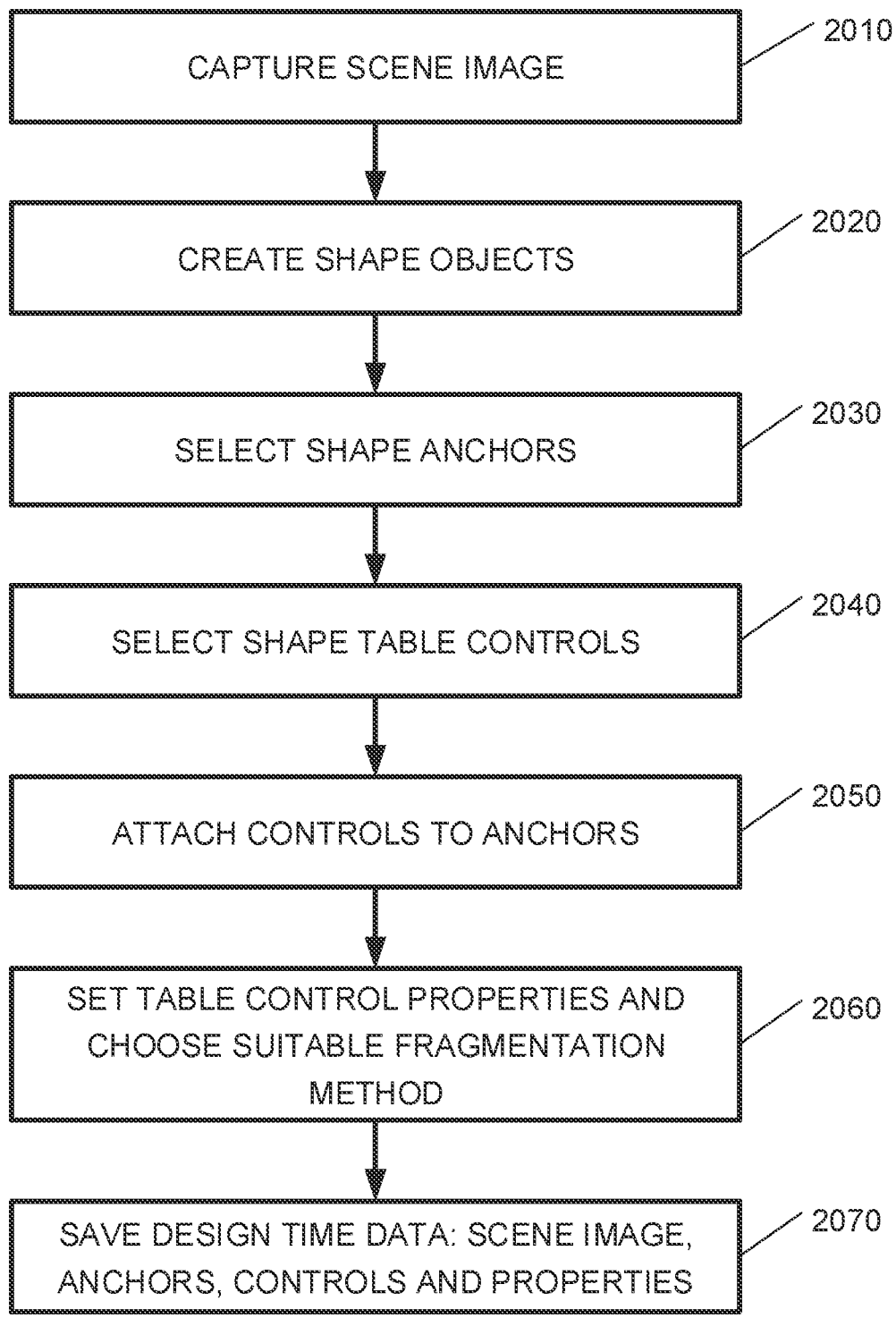
FIG. 20 is a flowchart illustration of a design phase of a method for accessing elements of a table in a digital image of the table, according to embodiments of the invention.

Reference is now made to FIG. 20 which is a flowchart illustration of a design phase of a method for accessing elements of a table in a digital image-of the table, according to embodiments of the invention. Elements and operations of the embodiment of FIG. 20 may be used with components of FIG. 1, or another system.

In operation 2010 a scene may be captured received or obtained. A scene may include a part of a GUI, a window presented on a display and including a table or grid. Receiving a scene may include, for example, capturing the image of the application as a "screenshot," e.g., by use of a print-screen function or other image and/or screen capture method and/or device, or receiving a previously captured image of the application. The application image may include an image of a table or a part of a table. In operation 2020 shape objects and a shape tree may be generated as disclosed herein. In operation 2030 anchors may be selected on the captured image, automatically by the processor or by the user. In operation 2040 controls may be selected on the captured image, automatically by the processor or by the user. In operation 2050 one or more controls may be attached or otherwise associated to one or more anchors, similarly to operation 255 (depicted in FIG. 2). Thus, geometric relationships between controls and anchors may be defined. This data may be used to identify controls of the scene at runtime. In operation 2060, table properties, including for example one or more of, table visual properties, fragmentation method, selection method any other required parameters and properties, may be determined as disclosed herein. In operation 2070 the table properties may be stored. For example, the table properties may be stored in a table object model associated with a table type. The table object model may later be used at runtime for accessing tables of the same type captured in operation 2010 through the image of the table at runtime. A type of a table may be a category depending on specified properties of a table, e.g., two tables with the same table properties may pertain to the same table type and two tables that differ by one or more table properties may pertain to different table types. According to some embodiments, the design phase may be repeated for different table types. For example, the table depicted in FIG. 15A includes horizontal and vertical gridlines and pertains to a first type of tables and the table depicted in FIG. 18A does not include gridlines except for row header gridlines and pertains to a second type of tables.

Figure 21:
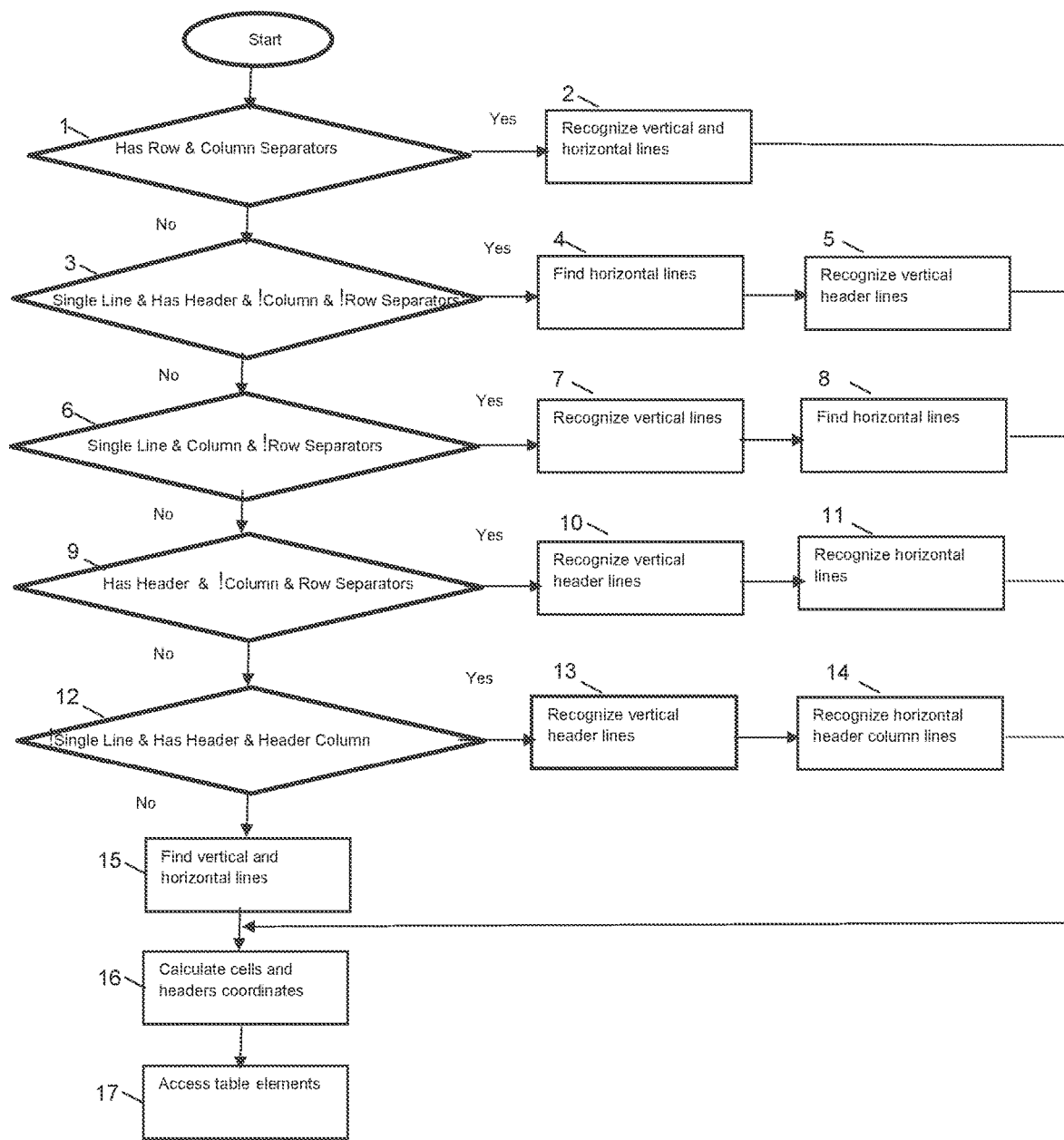
FIG. 21 is a flowchart illustration of a runtime phase of a method for accessing elements of a table in a digital image of the table, according to embodiments of the invention.

Reference is now made to FIG. 21 which is a flowchart illustration of a runtime phase of a method for accessing elements of a table in a digital image-of the table, according to embodiments of the invention. Elements and operations of the embodiment of FIG. 21 may be used with components of FIG. 1, or another system. In FIG. 21 the sign "&" refers to the logical operation AND, and the sign "!" refers to the logical operation NOT, In operation 1, it may be checked whether the properties "has column separators=TRUE AND "has row separators=TRUE". If true, operation 2 may be executed, else operation 3. In operation 2 the selected fragmentation method, e.g., the fragmentation method selected in the design phase, may be applied on the image of the table to get or calculate the coordinates of the horizontal and vertical gridlines. According to some embodiments, lines with unsuitable length may be filtered out.

In operation 3, it may be checked whether the properties "single line=TRUE AND has header separators=TRUE AND has column separators=FALSE AND has row separators=FALSE". If true operation 4 may be executed, else operation 6. In operation 4, the morphology detector method and/or the table skeleton method (e.g., as selected in the design phase since there are no row and column gridlines or separators) may be applied or used to get, find or detect bounding rectangles for text blocks in the table. The average row spacing value or the average row height may be calculated based on the bounding rectangles. The horizontal gridlines may be determined or placed between adjacent rows of rectangles. Similarly, the vertical gridlines may be determined or placed between adjacent columns of rectangles. In operation 5, a predefined fragmentation method may be applied to get header vertical gridlines coordinates, e.g., based on the calculated height value.

In operation 6, it may be checked whether the properties "single line=TRUE AND has column separators=TRUE AND has row separators=FALSE". If true operation 7 may be executed, else operation 9. In operation 7 the predefined fragmentation method, e.g., the fragmentation method selected in the design phase, may be applied or used to get or calculate the coordinates of the vertical gridlines. Lines with unsuitable length may be filtered out. In operation 8, the morphology detector method and/or the table skeleton method (as selected by the user in the design phase) may be applied or used to calculate or get bounding rectangles for text blocks. The average row spacing value or row height may be calculated. The average row spacing value or the average row height may be calculated based on the bounding rectangles. The horizontal gridlines may be determined or placed between adjacent rows of rectangles.

In operation 9, it may be checked or determined whether the properties "has header separators=TRUE AND has column separators=FALSE AND has row separators=TRUE". If true operation 10 may be executed, else operation 12. In operation 10, a predefined fragmentation method e.g., the fragmentation method selected in the design phase of the header vertical gridlines, may be applied or used to get or calculate the coordinates of the header vertical gridlines. In operation 11 a predefined fragmentation method e.g., the fragmentation method selected in the design phase for the horizontal gridlines, may be applied or used to get or calculate the coordinates of the horizontal gridlines. Lines with unsuitable length may be filtered out.

In operation 12, it may be checked whether the properties "single line=FALSE AND has header separators=TRUE AND Has header column separators=TRUE". If true operation 13 may be executed, else operation 15. In operation 13 a predefined fragmentation method e.g., the fragmentation method selected in the design phase for the header vertical gridlines, may be applied or used to get or calculate the coordinates of the header vertical gridlines. In operation 14, a predefined fragmentation method e.g., the fragmentation method selected in the design phase header column horizontal gridlines, may be applied or used to get or calculate the coordinates of the header column horizontal gridlines.

In operation 15, the table skeleton and/or morphology detector fragmentation methods, e.g., as selected by the user in the design phase, may be applied or used for non-gridded tables to get horizontal and vertical lines coordinates. In operation 16, coordinates of intersections of the vertical and horizontal gridlines may be found, determined or calculated to determine the table cells. Headers coordinates may be calculated as well if the properties "has header" and/or "has column header" are set in design time. In operation 17 table elements may be accessed.

Figure 22:
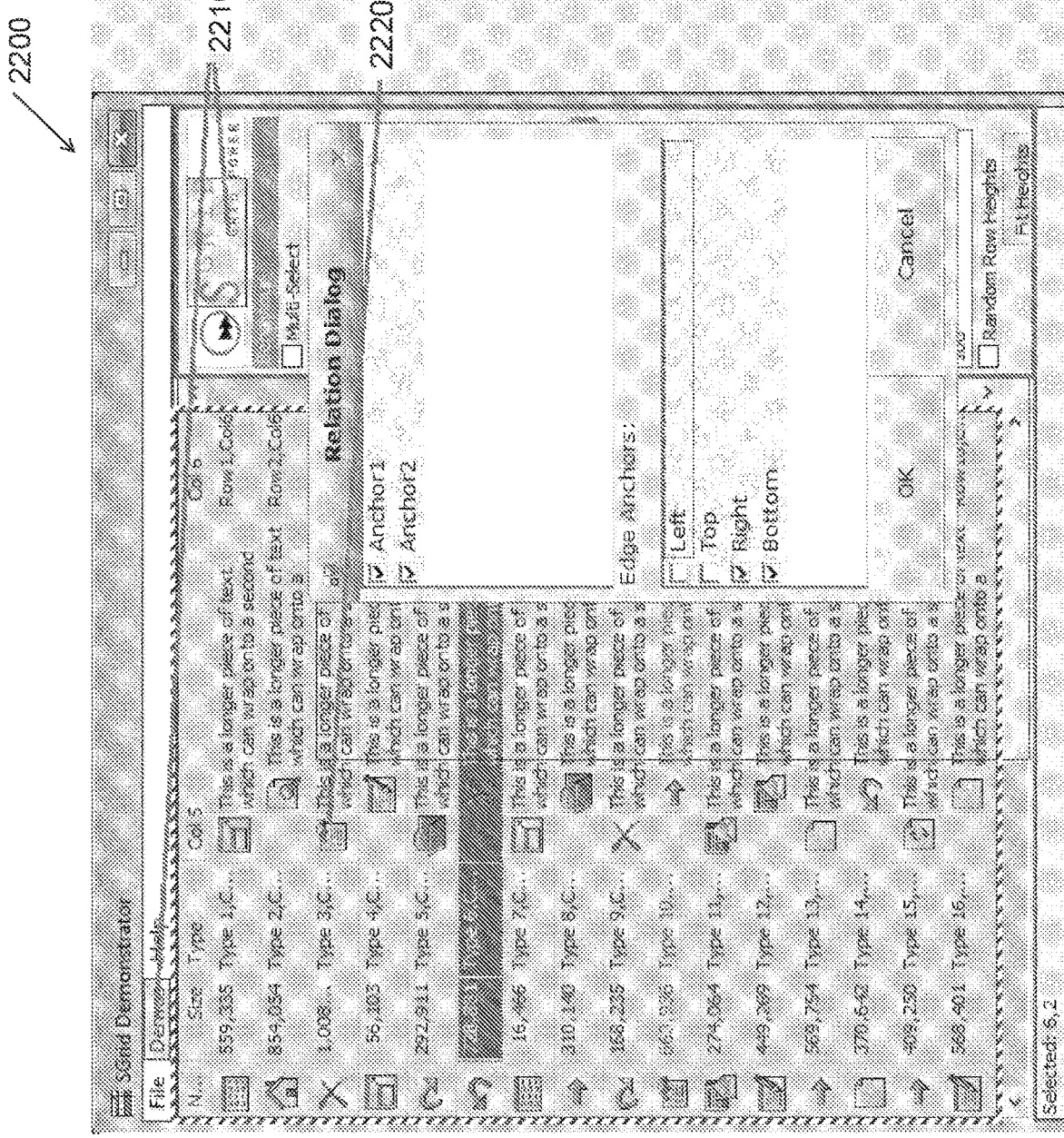
FIG. 22 depicts a digital image of a table, including anchors and controls, according to embodiments of the invention.
Figure 23:
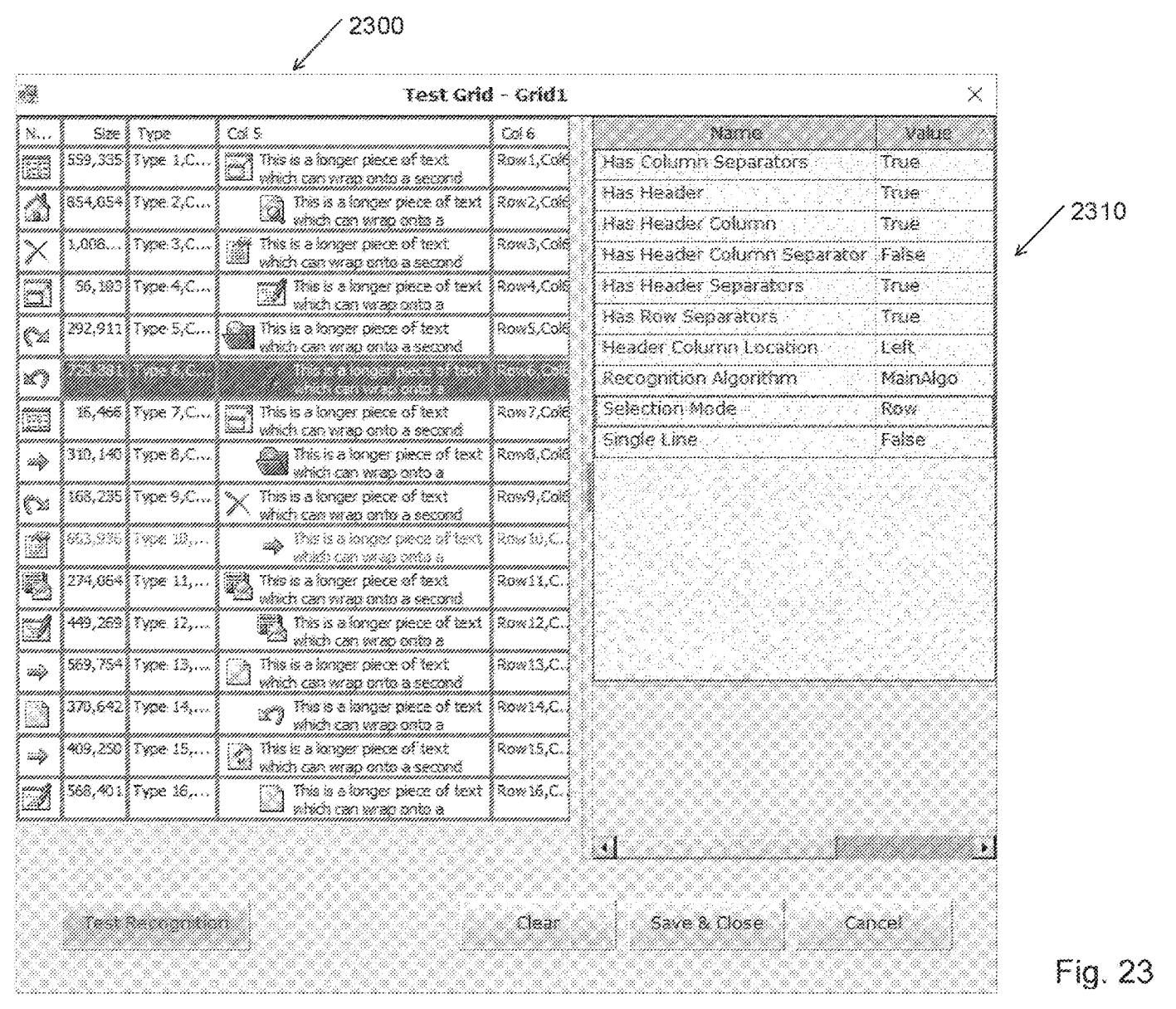

Examples for digital images are provided in FIG. 22 which depicts a digital image of a table 2200, including anchors 2210 and controls 2220, and in FIG. 23 which depicts a second digital image of a table 2300, and an example of a dialog box 2310 in which a user can define or input the table properties.

Other or different operations may be used.

Unless explicitly stated, the method embodiments described herein are not constrained to a particular order or sequence. Furthermore, all formulas described herein are intended as examples only and other or different formulas may be used. Some of the described method embodiments or elements thereof may occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A computer implemented method for accessing elements of a table in a digital image-of the table, the method comprising:
obtaining the digital image of the table;
finding table elements in the digital image based on digital table properties by processing the digital image using imaging processing techniques, wherein the table elements define table cells;
calculating relative locations of the table cells in the digital image based on the table elements; and
accessing content of a selected table cell in the digital image using the relative location of the selected table element.

2. The method of claim 1, wherein the table elements comprises at least one of gridlines and table text blocks.

3. The method of claim 1, wherein the digital table properties comprise at least one of: has row separators, has column separators, has row header, has row header separators, has column header, has column header separators, table direction, single line, selection mode and a fragmentation method.

4. The method of claim 3, comprising obtaining at least one of the digital table properties in a design phase prior to runtime.

5. The method of claim 3, wherein finding table elements in the digital image is performed using a fragmentation method that is selected from the list consisting of: an orthogonality filter method, a gridlines detection method, a morphology detection method, a table skeleton method a cartoonizing method and Fast line detector method.

6. The method of claim 5, wherein the orthogonality filter method comprises:
converting the digital image to a grayscale image;
applying a horizontal discrete differentiation operator to the grayscale image to calculate a horizontal derivative and vertical discrete differentiation operator to calculate a vertical derivative for pixels of the grayscale image, wherein the horizontal derivative and the vertical derivative of a pixel form a two-dimensional (2D) vector of the pixel;
calculating magnitudes and angles of the 2D vectors of the pixels of the grayscale image;
marking a pixel (i,j) as pertaining to a gridline if the pixel (i,j) and its (i+1,j), (i,j+1), (i+1,j+1) neighbors are orthogonal, wherein i and j are pixel indexes; and
extracting relative locations of vertical and horizontal gridlines.

7. The method of claim 6, wherein the cartoonizing method comprises:
downsampling to the digital image to obtain a down sampled image;
performing edge detection on the down sampled image to obtain a processed image;
applying a bilateral filter to the processed image to obtain a filtered image;
upsampling the filtered image to obtain a zoomed-out image;
smoothing the zoomed-out image by applying a median filter with n×n aperture, wherein n is an odd number, to obtain a of smoothed image;
converting the smoothed image to a smoothed grayscale image;
converting the smoothed grayscale image to a binary image with adaptive threshold;
resizing the binary image to the image size of the digital image to obtain a resized binary image; and
applying the orthogonality filter method to the resized binary image.

8. The method of claim 5, wherein the gridlines detection method comprises:
building grid mask by:

converting digital image of the table to a grayscale image;
blurring the grayscale image by applying a gaussian blur function to obtain a blurred image;
thresholding the blurred image to obtain a binary image;
scanning the binary image to obtain a pixel that is connected to a maximal number of pixels with a given color of the binary image; and
filling the connected pixels with a first color and the rest of the pixels with a second color to generate a mask; and
extracting relative locations of horizontal and vertical gridlines from the mask.

9. The method of claim 5, wherein the morphology detection method comprises:
thresholding the digital image to obtain a binary image;
blurring the binary image to obtain a blurred image;
performing edge detection on the blurred image to obtain a processed image;
obtaining a structuring element;
performing morphological image processing on the processed image using the structuring element, to find geometry shapes;
identifying contours of the geometry shapes using a contour approximation method, wherein the contours represent text blocks in the table image; and
generating vertical and horizontal lines between the table blocks, wherein the vertical and horizontal lines form the gridlines of the digital image.

10. The method of claim 5, wherein the table skeleton method comprises:
applying a Laplacian filter to the digital image to obtain a filtered image;
normalizing the filtered image to obtain a color image;
thresholding the color image to obtain a binary image;
blurring the binary image to obtain a blurred image;
calculating contours of a first color in the blurred image, wherein the contours represent text blocks in the digital image; and
generating vertical and horizontal lines between the table blocks, wherein the vertical and horizontal lines form the gridlines of the digital image.

11. The method of claim 1, wherein the relative locations are relative to a point in the digital image, an anchor or a control.

12. The method of claim 1, comprising presenting the digital image on a client device and wherein the computer is remote from the client device.

13. A system for accessing elements of a table in a digital image of a table, the system comprising:
a memory; and
a processor configured to:
obtain the digital image of the table;
find gridlines in the digital image based on digital table properties by processing the digital image using imaging processing techniques, wherein gridlines define table cells;
calculate relative locations of the table cells in the digital image based on the table elements; and
access content of a selected table cell in the digital image using the relative location of the selected table element.

14. The system of claim 13, wherein the digital table properties comprise at least one of: has row separators, has column separators, has row header, has row header separators, has column header, has column header separators, table direction, single line, selection mode and a fragmentation method.

15. The system of claim 13, wherein finding table elements in the digital image is performed using a fragmentation method that is selected from the list consisting of: an orthogonality filter method, a gridlines detection method, a morphology detection method, a table skeleton method a cartoonizing method and Fast line detector method.

16. The system of claim 15, wherein the orthogonality filter method comprises:
converting the digital image to a grayscale image;
applying a horizontal discrete differentiation operator to the grayscale image to calculate a horizontal derivative and vertical discrete differentiation operator to calculate a vertical derivative for pixels of the grayscale image, wherein the horizontal derivative and the vertical derivative of a pixel form a two-dimensional (2D) vector of the pixel;
calculating magnitudes and angles of the 2D vectors of the pixels of the grayscale image;
marking a pixel (i,j) as pertaining to a gridline if the pixel (i,j) and its (i+1,j), (i,j+1), (i+1,j+1) neighbors are orthogonal, wherein i and j are pixel indexes; and
extracting relative locations of vertical and horizontal gridlines.

17. The system of claim 16, wherein the cartoonizing method comprises:
downsampling to the digital image to obtain a down sampled image;
performing edge detection on the down sampled image to obtain a processed image;
applying a bilateral filter to the processed image to obtain a filtered image;
upsampling the filtered image to obtain a zoomed-out image;
smoothing the zoomed-out image by applying a median filter with n×n aperture, wherein n is an odd number, to obtain a of smoothed image;
converting the smoothed image to a smoothed grayscale image;
converting the smoothed grayscale image to a binary image with adaptive threshold;
resizing the binary image to the image size of the digital image to obtain a resized binary image; and
applying the orthogonality filter method to the resized binary image.

18. The system of claim 15, wherein the gridlines detection method comprises:
building grid mask by:
converting digital image of the table to a grayscale image;
blurring the grayscale image by applying a gaussian blur function to obtain a blurred image;
thresholding the blurred image to obtain a binary image;
scanning the binary image to obtain a pixel that is connected to a maximal number of pixels with a given color of the binary image; and
filling the connected pixels with a first color and the rest of the pixels with a second color to generate a mask; and
extracting relative locations of horizontal and vertical gridlines from the mask.

19. The system of claim 15, wherein the morphology detection method comprises:
thresholding the digital image to obtain a binary image;

blurring the binary image to obtain a blurred image;
performing edge detection on the blurred image to obtain a processed image;
obtaining a structuring element;
performing morphological image processing on the processed image using the structuring element, to find geometry shapes;
identifying contours of the geometry shapes using a contour approximation method, wherein the contours represent text blocks in the table image; and
generating vertical and horizontal lines between the table blocks, wherein the vertical and horizontal lines form the gridlines of the digital image.

20. The system of claim 15, wherein the relative locations are relative to a point in the digital image, an anchor or control.

\* \* \* \* \*